United States Patent
Han et al.

(10) Patent No.: US 11,071,094 B2
(45) Date of Patent: Jul. 20, 2021

(54) DATA TRANSMISSION METHOD, USER EQUIPMENT, AND RADIO ACCESS DEVICE

(71) Applicant: Huawei Technologies Co., Ltd., Shenzhen (CN)

(72) Inventors: Lifeng Han, Shenzhen (CN); Jian Zhang, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/454,879

(22) Filed: Jun. 27, 2019

(65) Prior Publication Data

US 2019/0320416 A1  Oct. 17, 2019

Related U.S. Application Data

(63) Continuation of application No. PCT/CN2017/118597, filed on Dec. 26, 2017.

(30) Foreign Application Priority Data

Dec. 29, 2016  (CN) .......................... 201611251386.9

(51) Int. Cl.
*H04W 72/02* (2009.01)
*H04W 28/06* (2009.01)
(Continued)

(52) U.S. Cl.
CPC .......... *H04W 72/02* (2013.01); *H04W 28/06* (2013.01); *H04W 72/0453* (2013.01); *H04W 80/02* (2013.01); *H04W 80/08* (2013.01)

(58) Field of Classification Search
CPC .................................................. H04W 72/02
See application file for complete search history.

(56) References Cited

U.S. PATENT DOCUMENTS

| 7,362,726 B2* | 4/2008 | Petrovic | H04W 28/02 370/329 |
| 2008/0037474 A1* | 2/2008 | Niwano | H04W 72/1268 370/335 |

(Continued)

FOREIGN PATENT DOCUMENTS

| CN | 101162938 A | 4/2008 |
| CN | 101674614 A | 3/2010 |

(Continued)

OTHER PUBLICATIONS

"Logical channel prioritisation," 3GPP TSG RAN WG2 meeting #15, Sophia Antipolis, France, R2-001587, pp. 1-3, 3rd Generation Partnership Project, Valbonne, France (Aug. 21-25, 2000).

*Primary Examiner* — John D Blanton
(74) *Attorney, Agent, or Firm* — Leydig, Voit & Mayer, Ltd.

(57) ABSTRACT

A data transmission method is provided. The method includes: receiving, by user equipment, first information from a radio access device, where the first information indicates different transmission classes corresponding to a plurality of logical channels; determining, by the user equipment based on the first information, a transmission format of uplink data on at least one logical channel corresponding to at least one transmission class in the different transmission classes, and determining a transmission resource in the transmission format; and sending, by the user equipment, the uplink data by using the transmission format and the transmission resource in the transmission format. In this application, different transmission resources are allocated to uplink data on logical channels (LCHs) of different transmission classes, so that different requirements of different uplink data can be met.

17 Claims, 5 Drawing Sheets

(51) Int. Cl.
*H04W 72/04* (2009.01)
*H04W 80/02* (2009.01)
*H04W 80/08* (2009.01)

(56) References Cited

U.S. PATENT DOCUMENTS

| | | | |
|---|---|---|---|
| 2008/0225765 A1* | 9/2008 | Marinier | H04B 7/155 |
| | | | 370/310 |
| 2009/0161571 A1* | 6/2009 | Terry | H04W 24/00 |
| | | | 370/252 |
| 2010/0135202 A1* | 6/2010 | Chun | H04L 1/1877 |
| | | | 370/328 |
| 2014/0078985 A1 | 3/2014 | Kanamarlapudi et al. | |
| 2014/0254452 A1 | 9/2014 | Von Elbwart et al. | |
| 2018/0279388 A1* | 9/2018 | Miao | H04W 16/02 |
| 2019/0356460 A1* | 11/2019 | Tsuboi | H04W 28/18 |

FOREIGN PATENT DOCUMENTS

| | | |
|---|---|---|
| CN | 101753196 A | 6/2010 |
| CN | 102665284 A | 9/2012 |
| CN | 102724713 A | 10/2012 |
| CN | 104507169 A | 4/2015 |
| CN | 105163346 A | 12/2015 |
| JP | 2015502089 A | 1/2015 |
| JP | 2015529049 A | 10/2015 |
| KR | 20150018300 A | 2/2015 |
| RU | 2404543 C2 | 11/2010 |
| RU | 2477021 C2 | 2/2013 |
| RU | 2533175 C2 | 11/2014 |

\* cited by examiner

DATA TRANSMISSION METHOD, USER EQUIPMENT, AND RADIO ACCESS DEVICE

CROSS-REFERENCE TO RELATED APPLICATIONS

This application is a continuation of International Application No. PCT/CN2017/118597, filed on Dec. 26, 2017, which claims priority to Chinese Application No. 201611251386.9, filed on Dec. 29, 2016. The disclosures of the aforementioned applications are hereby incorporated by reference in their entireties.

TECHNICAL FIELD

Embodiments of this application relate to the field of communications technologies, and in particular, to a data transmission method, user equipment, and a radio access device.

BACKGROUND

Currently, a long term evolution (LTE) system is widely applied to the wireless transmission field due to advantages of a high rate and a low delay. When user equipment has uplink data to be transmitted, the user equipment needs to first request, from a radio access device, a resource required to transmit the uplink data. Specifically, the user equipment reports an amount of to-be-sent uplink data to the radio access device. The radio access device allocates a resource to the user equipment according to a specific policy and based on resource usage and amounts of to-be-sent uplink data that are reported by all user equipments, and indicates an available transmission resource to the user equipment. The user equipment transmits data after receiving a transmission resource indication.

In a prior-art solution, in a process of transmitting uplink data by using transmission resources, the user equipment determines, based on a service priority of the uplink data, a sequence for using the transmission resources. However, different services have requirements for a packet loss rate in addition to requirements for a service priority, and there is no correspondence between the packet loss rate and the service priority. A service with a low service priority may have a relatively high requirement for a packet loss rate (this is corresponding to a case in which the packet loss rate is relatively low). However, in the prior-art solution, only the service priority is considered, and consequently transmission resources used for a service with a relatively high requirement for the packet loss rate cannot ensure a packet loss rate of the service. As a result, it is difficult to meet different transmission requirements of different uplink data.

SUMMARY

Embodiments of this application provide a data transmission method, user equipment, and a radio access device. Different transmission resources are allocated to uplink data on LCHs of different transmission classes, to meet different requirements of different uplink data.

According to a first aspect, an embodiment of this application provides a data transmission method, including:

receiving, by user equipment, first information from a radio access device, where the first information indicates different transmission classes corresponding to a plurality of logical channels;

determining, by the user equipment based on the first information, a transmission format of uplink data on at least one logical channel corresponding to at least one transmission class in the different transmission classes, and determining transmission resources in the transmission format; and sending, by the user equipment, the uplink data by using the transmission format and the transmission resources in the transmission format.

Optionally, one LCH is corresponding to one transmission class, and the transmission class of the LCH may be determined based on at least one of: a reliability class and a delay class of a service on the LCH; and optionally may be determined based on a service priority. For example, the transmission class includes at least one of: the reliability class and the delay class of the service, and optionally may further include the service priority. Alternatively, the transmission class is determined based on at least two of a service priority, a reliability class, and a delay class of the service; or the transmission class is determined based on at least two of parameters such as a priority, a reliability requirement, and a delay requirement of the service.

In an embodiment of the first aspect, different logical channels in the user equipment are corresponding to different transmission classes. In a process of transmitting uplink data on a logical channel, the user equipment transmits the uplink data by using a transmission format used for the uplink data on the logical channel corresponding to the transmission class, and transmission resources in the transmission format. In addition, transmission resources used for uplink data that are determined based on transmission classes can meet different requirements of different uplink data, thereby improving data transmission flexibility.

In an optional embodiment, before the determining, by the user equipment based on the first information, a transmission format of uplink data on at least one logical channel corresponding to at least one transmission class in the different transmission classes, and determining transmission resources in the transmission format, the method further includes:

sending, by the user equipment, second information to the radio access network device, where the second information indicates an amount of the to-be-sent uplink data on the at least one logical channel corresponding to the at least one transmission class in the different transmission classes. The user equipment may report an amount of to-be-sent uplink data on an LCH corresponding to each transmission class in the different transmission classes, or the user equipment may report amounts of to-be-sent uplink data on LCHs corresponding to several transmission classes in the different transmission classes. In this way, the radio access device can allocate transmission resources to the user equipment based on the amounts of to-be-sent uplink data, thereby improving resource allocation effectiveness.

In an optional embodiment, before the determining, by the user equipment based on the first information, a transmission format of uplink data on at least one logical channel corresponding to at least one transmission class in the different transmission classes, and determining transmission resources in the transmission format, the method further includes:

receiving, by the user equipment, third information sent by the radio access device, where the third information indicates the transmission format used for the uplink data on the at least one logical channel corresponding to the at least one transmission class in the different transmission classes, and indicates the transmission resources in the transmission format.

Optionally, the third information carries each transmission class in the at least one transmission class, a transmission format corresponding to each transmission class, and transmission resources in the transmission format corresponding to the transmission class; or the third information includes a transmission format corresponding to each transmission class in the at least one transmission class, and includes transmission resources in the transmission format corresponding to the transmission class; and each transmission class is indicated by using a second location index corresponding to the transmission class, and the second location index is used to identify the transmission format corresponding to each transmission class in the at least one transmission class and a location, in the third information, of the transmission resources in the transmission format corresponding to the transmission class; or the third information includes a transmission format corresponding to each transmission class in the at least one transmission class, and includes transmission resources in the transmission format corresponding to the transmission class.

In an optional embodiment, the at least one transmission class comprises all transmission classes in the different transmission classes.

In an optional embodiment, the at least one transmission class is a transmission class indicated by the radio access device in the different transmission classes.

In an optional embodiment, the method further includes: receiving, by the user equipment, fourth information sent by the radio access device, where the fourth information indicates a first location index of each transmission class in the at least one transmission class, and the first location index is used to identify a location, in the second information, of an amount of to-be-sent uplink data of each transmission class in the at least one transmission class. This can save a transmission bit, and improve data transmission efficiency.

In an optional embodiment, uplink data on each logical channel in the at least one logical channel is a plurality of uplink data packets, and the method further includes: in a process in which the user equipment sends the plurality of uplink data packets, preferentially allocating, by the user equipment, more transmission resources to an uplink data packet with a high priority in the plurality of uplink data packets.

In an optional embodiment, before the preferentially allocating, by the user equipment, more transmission resources to an uplink data packet with a high service priority in the plurality of uplink data packets, the method further includes:

allocating, by the user equipment, a preset proportion of transmission resources to each of the plurality of uplink data packets.

In an optional embodiment, the method further includes: in a process in which the user equipment sends uplink data on a target logical channel, where the target logical channel is a logical channel in the at least one logical channel, if a timer, at a PDCP layer, of a target data packet in the uplink data expires, discarding, by the user equipment, the target data packet at the PDCP layer; and notifying, by using an RLC layer, an RLC layer of the radio access device of an identifier of the target data packet.

In an optional embodiment, the method further includes: in a process in which the user equipment sends uplink data on a target logical channel, where the target logical channel is a logical channel in the at least one logical channel, if a timer, at an RLC layer, of a target data packet in the uplink data expires, discarding, by the user equipment, the target data packet at the RLC layer; and notifying, by using the RLC layer, an RLC layer of the radio access device of an identifier of the target data packet.

In an optional embodiment, the method further includes: in a process in which the user equipment sends uplink data on a target logical channel, where the target logical channel is a logical channel in the at least one logical channel, if a timer, at a MAC layer, of a target data packet in the uplink data expires, discarding, by the user equipment, the target data packet at the MAC layer; and notifying, by using an RLC layer, an RLC layer of the radio access device of an identifier of the target data packet.

According to a second aspect, an embodiment of this application provides a data transmission method, including: sending, by a radio access device, first information to user equipment, where the first information indicates different transmission classes corresponding to a plurality of logical channels; where the first information is used by the user equipment to determine a transmission format of uplink data on at least one logical channel corresponding to at least one transmission class in the different transmission classes, and determine transmission resources in the transmission format.

In an embodiment of the second aspect, different logical channels in the user equipment are corresponding to different transmission classes. In a process of transmitting uplink data on a logical channel, the user equipment transmits the uplink data by using a transmission format used for the uplink data on the logical channel corresponding to the transmission class, and transmission resources in the transmission format. In addition, transmission resources used for uplink data that are determined based on transmission classes can meet different requirements of different uplink data, thereby improving data transmission flexibility.

In an optional embodiment, the method further includes: receiving, by the radio access device, second information from the user equipment, where the second information indicates an amount of the to-be-sent uplink data on the at least one logical channel corresponding to the at least one transmission class in the different transmission classes.

Further, the radio access device allocates a transmission format and transmission resources in the transmission format to the at least one logical channel based on the second information.

In an optional embodiment, the method further includes: sending, by the radio access device, third information to the user equipment, where the third information indicates the transmission format used for the uplink data on the at least one logical channel corresponding to the at least one transmission class in the different transmission classes, and indicates the transmission resources in the transmission format.

Optionally, the third information carries each transmission class in the at least one transmission class, a transmission format corresponding to each transmission class, and transmission resources in the transmission format corresponding to the transmission class; or the third information includes a transmission format corresponding to each transmission class in the at least one transmission class, and includes transmission resources in the transmission format corresponding to the transmission class; and each transmission class is indicated by using a second location index corresponding to the transmission class, and the second location index is used to identify the transmission format corresponding to each transmission class in the at least one transmission class and a location, in the third information, of the transmission resources in the transmission format corresponding to the transmission class; or the third information includes a transmission format corresponding to each transmission class in the at least one transmission class, and includes transmission resources in the transmission format corresponding to the transmission class.

In an optional embodiment, the method further includes: sending, by the radio access device, fourth information to the user equipment, where the fourth information indicates a first location index of each transmission class in the at least one transmission class, and the first location index is used to identify a location, in the second information, of an amount of to-be-sent uplink data of each transmission class in the at least one transmission class. This can save a transmission bit, and improve data transmission efficiency.

According to a third aspect, an embodiment of this application provides user equipment, including:

a receiving unit, configured to receive first information sent by a radio access device, where the first information indicates different transmission classes corresponding to a plurality of logical channels;

a determining unit, configured to, based on the first information, determine a transmission format of uplink data on at least one logical channel corresponding to at least one transmission class in the different transmission classes, and determine transmission resources in the transmission format; and a sending unit, configured to send the uplink data by using the transmission format and the transmission resources in the transmission format.

The user equipment provided in the third aspect of the embodiments of this application is configured to perform the data transmission method provided in the first aspect of this application. For details, refer to the descriptions of the first aspect of the embodiments of this application. Details are not described herein again.

In a possible design, a structure of the user equipment includes a processor and a transceiver. The processor is configured to perform the data transmission method provided in the first aspect of this application. Optionally, the structure of the user equipment may further include a memory. The memory is configured to store application program code that supports the user equipment in performing the foregoing method, and the processor is configured to perform the application program stored in the memory.

According to a fourth aspect, an embodiment of this application provides a radio access device, including:

a sending unit, configured to send first information to user equipment, where the first information indicates different transmission classes corresponding to a plurality of logical channels; where the first information is used by the user equipment to determine a transmission format of uplink data on at least one logical channel corresponding to at least one transmission class in the different transmission classes, and determine transmission resources in the transmission format.

The radio access device provided in the fourth aspect of the embodiments of this application is configured to perform the data transmission method provided in the second aspect of this application. For details, refer to the descriptions of the second aspect of the embodiments of this application. Details are not described herein again.

In a possible design, a structure of the radio access device includes a processor and a transceiver. The processor is configured to perform the data transmission method provided in the second aspect of this application. Optionally, the structure of the radio access device may further include a memory. The memory is configured to store application program code that supports the radio access device in performing the foregoing method, and the processor is configured to perform the application program stored in the memory.

According to a fifth aspect, an embodiment of this application provides a computer storage medium, configured to store a computer software instruction used by the user equipment, and the computer software instruction includes a program designed to perform the foregoing aspects.

According to a sixth aspect, an embodiment of this application provides a computer storage medium, configured to store a computer software instruction used by the radio access device, and the computer software instruction includes a program designed to perform the foregoing aspects.

In the embodiments of this application, names of the user equipment and the radio access device constitute no limitation on the devices. In actual implementation, these devices may appear with other names. Provided that functions of the devices are similar to those in this application, the devices fall within the scope of the claims of this application and their equivalent technologies.

In the embodiments of this application, different logical channels in the user equipment are corresponding to different transmission classes. In a process of transmitting uplink data on a logical channel, the user equipment transmits the uplink data by using a transmission format used for the uplink data on the logical channel corresponding to the transmission class, and transmission resources in the transmission format. However, the transmission class includes at least one of: a reliability class and a delay class of service, and optionally may further include a service priority; or the transmission class is determined based on at least two of a service priority, a reliability class, and a delay class of a service. Therefore, transmission resources used for uplink data that are determined based on transmission classes can meet different requirements of different uplink data, thereby improving data transmission flexibility.

DESCRIPTION OF EMBODIMENTS

The following describes the embodiments of this application with reference to accompanying drawings.

Figure 1:
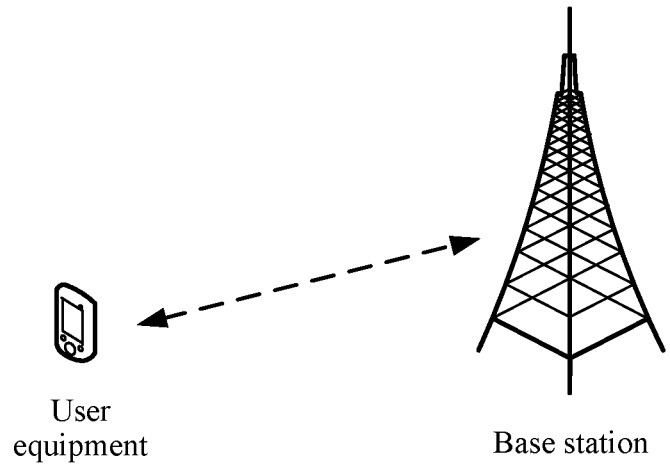
FIG. 1 is a diagram of a possible network architecture according to an embodiment of this application.

FIG. 1 is a diagram of a possible network structure according to an embodiment of this application. The network architecture shown in FIG. 1 may include user equipment and a radio access device. When the user equipment has uplink data that needs to be transmitted, the user equipment needs to first request, from the radio access device, transmission resources required to transmit the uplink data. Specifically, the user equipment reports an amount of to-be-sent uplink data on a/each logical channel (LCH) to the radio access device. For example, the user equipment notifies the radio access device of the amount of to-be-sent uplink data in the user equipment by using a buffer status report (BSR). The radio access device allocates transmission resources to the user equipment based on the amount, of to-be-sent uplink data, that is reported by the user equipment and current transmission resource usage, and indicates available transmission resources to the user equipment. The user equipment transmits data after receiving a transmission resource indication.

In a prior-art solution, in a process of transmitting uplink data by using transmission resources, the user equipment determines, based on a service priority of the uplink data, a sequence for using the transmission resources. To be specific, uplink data with a high service priority is preferably transmitted on the transmission resources, and a service with a low service priority is sent later. However, different services have requirements for a packet loss rate in addition to requirements for a service priority, and there is no correspondence between the packet loss rate and the service priority. A service with a low service priority may have a relatively high requirement for the packet loss rate (this is corresponding to a case in which the packet loss rate is relatively low). However, in the prior-art solution, only the service priority is considered, and consequently transmission resources used for a service with a relatively high requirement for the packet loss rate cannot ensure a packet loss rate of the service. As a result, it is difficult to meet different transmission requirements of different uplink data.

In the embodiments of this application, different logical channels in the user equipment are corresponding to different transmission classes. In a process of transmitting uplink data on a logical channel, the user equipment transmits the uplink data by using a transmission format used for the uplink data on the logical channel corresponding to the transmission class, and transmission resources in the transmission format. However, the transmission class includes at least one of: a reliability class and a delay class of the service, and may further include a service priority; or the transmission class is determined based on at least two of a service priority, a reliability class, and a delay class of a service. Therefore, transmission resources used for uplink data that are determined based on transmission classes implement that different transmission resources are allocated to uplink data on LCHs of different transmission classes, and can meet different requirements of different uplink data, thereby improving data transmission flexibility.

In the specification, claims, and accompanying drawings of this application, the terms "first", "second", "third", "fourth" and so on are intended to distinguish between different objects but do not indicate a particular order. In addition, the terms "including", "comprising", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

In the embodiments of this application, the user equipment may include but is not limited to a terminal, a mobile station (MS), and the like. The user equipment may be a mobile phone (or referred to as a "cellular" phone), or may be a portable, pocket-sized, handheld, computer built-in, or in-vehicle mobile apparatus (a smart band, a smartwatch, smart glasses, or the like).

A radio access device and the user equipment in the embodiments of this application may appear with other names. Provided that functions of the devices are similar to those in this application, the devices fall within the scope of the claims of this application and their equivalent technologies.

Figure 2:
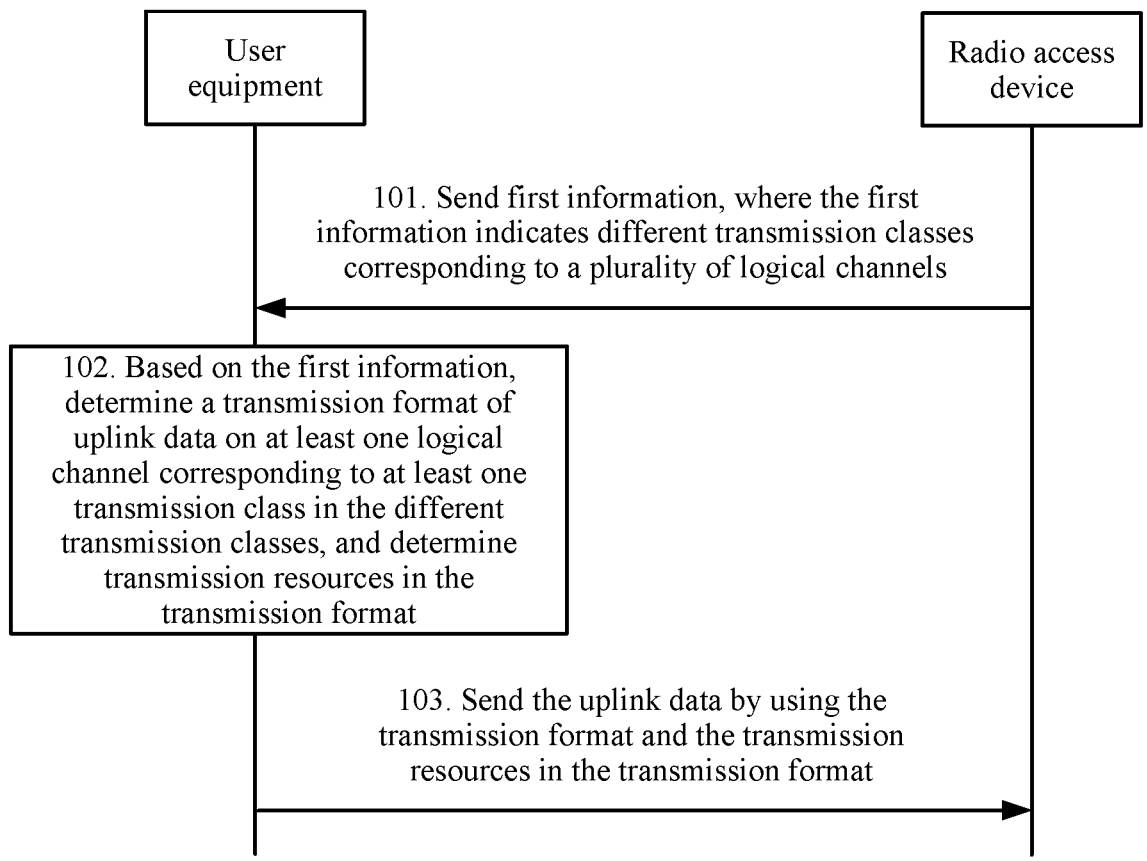
FIG. 2 is a schematic flowchart of a data transmission method according to an embodiment of this application.

FIG. 2 is a schematic flowchart of a data transmission method according to an embodiment of this application. As shown in FIG. 2, the data transmission method in this embodiment of this application includes step 101 to step 103. The data transmission method in this embodiment of this application is performed through interaction between user equipment and a radio access device. For a specific process, refer to the following detailed descriptions.

101. The radio access device sends first information to the user equipment, where the first information indicates different transmission classes corresponding to a plurality of logical channels (two or more logical channels).

One LCH is corresponding to one transmission class, and the transmission class of the LCH may be determined based on at least one of: a reliability class and a delay class of a service on the LCH, and optionally may be determined based on a service priority. For example, the transmission class includes at least one of: the reliability class and the delay class of the service, and optionally may further include the service priority. Alternatively, the transmission class is determined based on at least two of a service priority, a reliability class, and a delay class of the service; or the transmission class is determined based on at least two of parameters such as a priority, a reliability requirement, and a delay requirement of the service.

The reliability class of the service is a requirement class of the service for transmission reliability.

The delay class of the service is a requirement class of the service for a transmission delay. Optionally, the transmission delay is a transmission time for transmitting uplink data from the user equipment to a core network device, or the transmission delay is a transmission time for transmitting uplink data from the user equipment to the radio access device. The transmission delay may be determined by subtracting an estimated transmission time for transmitting the uplink data from the radio access device to the core network device from the transmission time for transmitting the uplink data from the user equipment to the core network device.

The service priority is used to represent a class for scheduling uplink data, for example, information about which service is sent first and which service is sent later.

Optionally, determining the transmission class based on the reliability class of the service and the delay class of the service is generating a transmission class based on the reliability class and the delay class of the service. In one solution, the transmission class may be obtained in a weighting manner of performing a weighting operation on the reliability class and the delay class. If the reliability class is 1, the delay class is 2, and weighting coefficients are respectively 40% and 60%, a transmission class value is 1.6. Alternatively, in another solution, the transmission class may be generated by using a pre-configured relationship between a transmission class and each of a reliability class and a delay class. If the reliability class is 1, and the delay class is 2, the transmission class obtained based on the pre-configured relationship is 3.

When there is only one service on an LCH, the radio access device may directly determine, based on at least one of: a reliability class and a delay class of the service, and optionally based on a service priority, a transmission class of the LCH on which the service is located.

When there are a plurality of services on an LCH, the radio access device may first determine a transmission class of each service based on at least one of: a reliability class and a delay class of the service, and optionally based on a service priority, and then combine transmission classes of the plurality of services on the LCH to obtain one transmission class of the LCH. The radio access device may determine a combination manner according to a preset algorithm, and notify the user equipment of the combined transmission class of the LCH. For example, the preset algorithm may be selecting a highest transmission class from the transmission classes of the plurality of services, or weighting the plurality of transmission classes to generate a weighted value.

Correspondingly, the user equipment receives the first information sent by the radio access device, and stores the transmission classes corresponding to the LCHs.

Optionally, different transmission classes of a plurality of LCHs may be transmitted for a plurality of times. For example, a transmission class of one LCH is sent at a time, or transmission classes of at least two LCHs are sent at a time. In this way, the radio access device may send the different transmission classes of the plurality of LCHs for a plurality of times. Further, the first information may include a transmission class of one or more LCHs.

Optionally, the service in this embodiment of this application may be a group of data flows (QoS flow) having a same quality of service QoS parameter.

In this embodiment, for example, representation forms of the different transmission classes that are corresponding to the plurality of logical channels and that are indicated in the first information are shown in Table 1. One logical channel in a logical channel group is corresponding to one transmission class, and bears at least one service of this transmission class.

TABLE 1

| Logical channel group 1 | Logical channel 1 | Service 1 | Transmission class 1 |
|---|---|---|---|
| | | Service 2 | Transmission class 1 |
| | Logical channel 2 | Service 3 | Transmission class 2 |
| | Logical channel 3 | Service 4 | Transmission class 3 |
| | | Service 5 | Transmission class 3 |
| ... | ... | | ... |

102. The user equipment, based on the first information, determines a transmission format of uplink data on at least one logical channel corresponding to at least one transmission class in the different transmission classes, and determines transmission resources in the transmission format.

If one or more LCHs in the user equipment have uplink data that needs to be transmitted, the user equipment determines a transmission class of an LCH having to-be-transmitted uplink data, and determines a transmission format of uplink data on an LCH corresponding to each transmission class. For example, if transmission classes of LCHs having to-be-transmitted uplink data are a transmission class A and a transmission class B, the transmission class A is corresponding to two LCHs, and the transmission class B is corresponding to one LCH, the user equipment determines a transmission format of uplink data on the two LCHs corresponding to the transmission class A, and determines a transmission format of uplink data on one LCH corresponding to the transmission class B.

Further, after determining the transmission format used by the LCH having to-be-transmitted uplink data, the user equipment selects transmissions resource in the transmission format.

In this embodiment of this application, the transmission format may include but is not limited to a transmission time interval (TTI) format, a modulation and coding scheme (MCS) format, a hybrid automatic repeat request (HARQ) configuration, a multiple-input multiple-output (MIMO) configuration, a beam resources, and a numerology. The numerology means that configuration parameters used for orthogonal frequency division multiplexing (OFDM) are different at a physical layer. For example, the configuration parameters are different in terms of at least one of: a subcarrier spacing and a guard prefix length. As a result, time-frequency resources included in a resource element (RE) are different from time-frequency resources included in a resource block (RB). The transmission resources are physical time-frequency resources, may be represented in a form of an RE, an RB, or the like, and may further include transmission resources such as HARQs at a media access control (MAC) layer. For example, in an LTE system, one subcarrier in frequency domain and one symbol in time domain may be referred to as one RE. 12 consecutive subcarriers in frequency domain and one slot in time domain may be referred to as one RB. A representation format of the physical time-frequency resources is not limited herein.

103. The user equipment sends the uplink data by using the transmission format and the transmission resources in the transmission format.

The user equipment sends the to-be-transmitted uplink data on the LCH by using the determined transmission resources.

Correspondingly, the radio access device receives the uplink data sent by the user equipment.

In this embodiment of this application, different LCHs in the user equipment are corresponding to different transmission classes. In a process of transmitting uplink data on an LCH, the user equipment transmits the uplink data by using a transmission format used for the uplink data on the LCH corresponding to the transmission class, and transmission resources in the transmission format. However, the transmission class includes at least one of: a reliability class and a delay class of the service, and optionally may further include a service priority; or the transmission class is determined based on at least two of a service priority, a reliability class, and a delay class of a service. Therefore, transmission resources used for uplink data that are determined based on transmission classes can meet different requirements of different uplink data, thereby improving data transmission flexibility.

Figure 3:
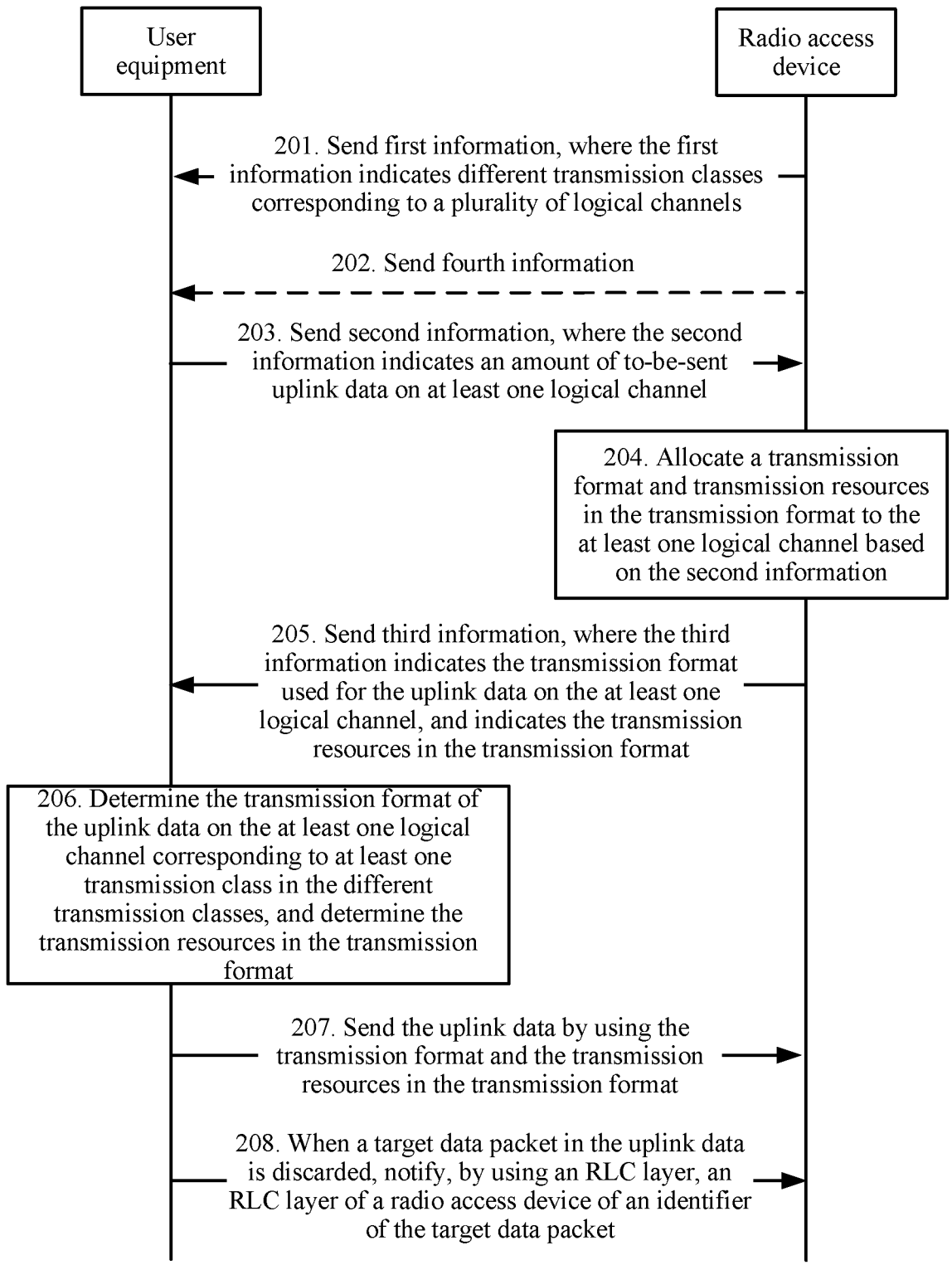
FIG. 3 is a schematic flowchart of another data transmission method according to an embodiment of this application.

FIG. 3 shows another data transmission method according to an embodiment of this application. As shown in FIG. 3, the data transmission method in this embodiment of this application includes step 201 to step 207. The data transmission method in this embodiment of this application is performed through interaction between user equipment and a radio access device. In this embodiment of this application, a transmission class is a transmission class of an LCH. For a specific process, refer to the following detailed descriptions.

201. The radio access device sends first information to the user equipment, where the first information indicates different transmission classes corresponding to a plurality of logical channels.

One LCH is corresponding to one transmission class, and the transmission class of the LCH may be determined based on at least one of: a reliability class and a delay class of a service on the LCH, and optionally may be determined based on a service priority. For example, the transmission class includes at least one of: the reliability class and the delay class of the service, and optionally may further include the service priority. Alternatively, the transmission class is determined based on at least two of a service priority, a reliability class, and a delay class of the service; or the transmission class is determined based on at least two of parameters such as a priority, a reliability requirement, and a delay requirement of the service.

The reliability class of the service is a requirement class of the service for transmission reliability.

The delay class of the service is a requirement class of the service for a transmission delay. Optionally, the transmission delay is a transmission time for transmitting uplink data from the user equipment to a core network device, or the transmission delay is a transmission time for transmitting uplink data from the user equipment to the radio access device. The transmission delay may be determined by subtracting an estimated transmission time for transmitting the uplink data from the radio access device to the core network device from the transmission time for transmitting the uplink data from the user equipment to the core network device.

The service priority is used to represent a class for scheduling uplink data, for example, information about which service is sent first and which service is sent later.

It may be understood that determining the transmission class based on the reliability class of the service and the delay class of the service is generating a transmission class based on the reliability class and the delay class of the service. In one solution, the transmission class may be obtained in a weighting manner of performing a weighting operation on the reliability class and the delay class. If the reliability class is 1, the delay class is 2, and weighting coefficients are respectively 40% and 60%, a transmission class value is 1.6. Alternatively, in another solution, the transmission class may be generated by using a pre-configured relationship between a transmission class and each of a reliability class and a delay class. If the reliability class is 1, and the delay class is 2, the transmission class obtained based on the pre-configured relationship is 3.

When there is only one service on an LCH, the radio access device may directly determine, based on at least one of: a reliability class and a delay class of the service, and optionally based on a service priority, a transmission class of the LCH on which the service is located.

When there are a plurality of services on an LCH, the radio access device may first determine a transmission class of each service based on at least one of: a reliability class and a delay class of the service, and optionally based on a service priority, and then combine transmission classes of the plurality of services on the LCH to obtain one transmission class of the LCH. The radio access device may determine a combination manner according to a preset algorithm, and notify the user equipment of the combined transmission class of the LCH. For example, the preset algorithm may be selecting a highest transmission class from the transmission classes of the plurality of services, or weighting the plurality of transmission classes to generate a weighted value.

Correspondingly, the user equipment receives the first information sent by the radio access device, and stores the transmission classes corresponding to the LCHs.

Optionally, different transmission classes of a plurality of LCHs may be transmitted for a plurality of times. For example, a transmission class of one LCH is sent at a time, or transmission classes of at least two LCHs are sent at a time. In this way, the radio access device may send the different transmission classes of the plurality of LCHs for a plurality of times. Further, the first information may include a transmission class of one or more LCHs.

Optionally, the service in this embodiment of this application may be a group of data flows (QoS flow) having a same QoS parameter.

In a first feasible solution, the first information sent by the radio access device to the user equipment is a service identifier and a transmission class corresponding to the service identifier. An LCH on which uplink data indicated by the service identifier is located is determined based on the service identifier, and a transmission class corresponding to the LCH is further determined. The service identifier may be a traffic flow template (TFT) or a data flow identifier (flow ID) that is corresponding to a service, or a QoS identifier of a service. For example, there are three transmission classes such as a high class, a medium class, and a low class. If a value is used to represent a transmission class, the transmission class sent by the radio access device may be represented by setting a value, for example, 1, 2, 3, . . . , N, where 1 represents a highest class, and N represents a lowest class.

In a second feasible solution, the first information sent by the radio access device to the user equipment is a service identifier of uplink data and a QoS parameter corresponding to the service identifier of the uplink data. Likewise, a transmission class of an LCH on which a service indicated by the service identifier is located is determined based on a correspondence between a service identifier and a transmission class. After receiving the service identifier of the uplink data and the QoS parameter corresponding to the service identifier of the uplink data that are sent by the radio access device, the user equipment determines, based on a table of a mapping relationship between a QoS parameter and a transmission class, the transmission class of the LCH on which the service indicated by the service identifier is located. Optionally, the core network device notifies the radio access device of the QoS. The radio access device may preset the table of the mapping relationship between a QoS parameter and a transmission class, and notify the user equipment of the mapping relationship table, so that the user equipment determines a transmission class of each LCH by using the table of the mapping relationship between a QoS parameter and a transmission class.

The QoS parameter includes one or more of parameters such as a priority, a packet loss rate, a transmission delay, and a rate.

For example, the table of the mapping relationship between a QoS parameter and a transmission class may be a table of a mapping relationship between a QoS class identifier (QCI) and a transmission class. The QCI includes one or a combination of a plurality of indicators in QoS parameters such as a priority, a packet loss rate, and a delay in the QoS parameter, and may define a mapping relationship between a QCI and a transmission class, for example, a mapping relationship in which a transmission class corresponding to a case of QCI=5 is 1, a transmission class corresponding to a case of QCI=3 is 2, and so on.

For another example, when the transmission class includes a reliability class, the table of the mapping relationship between a QoS parameter and a transmission class may be a table of a mapping relationship between a packet loss rate and a reliability class in a transmission class, for example, a mapping relationship table in which a reliability class in a transmission class corresponding to a packet loss rate in a range of ($10^{-7}$ to $10^{-6}$) is 1, a reliability class in a transmission class corresponding to a packet loss rate in a range of ($10^{-6}$ to $10^{-3}$) is 2, and so on.

For another example, when the transmission class includes a delay class, the table of the mapping relationship between a QoS parameter and a transmission class may be a table of a mapping relationship between a delay indicator and a delay class in a transmission class. For example, when the delay indicator is 100 ms, a delay class in a corresponding transmission class is 1; or when a delay indicator is 300 ms, a delay class in a corresponding transmission class is 9.

In a third feasible solution, the first information sent by the radio access device to the user equipment is a service identifier of downlink data and a QoS parameter corresponding to the service identifier of the downlink data. After receiving the service identifier of the downlink data and the QoS parameter corresponding to the service identifier of the downlink data, the user equipment first obtains an IP 5-tuple of the downlink data of a service, and obtains an IP 5-tuple of uplink data of the service by inverting IP 5-tuple information of the downlink data. The IP 5-tuple includes a source IP address, a source port, a destination IP address, a destination port, and a transport layer protocol. An inversion function may be implemented by inverting the source IP address and the destination IP address, and inverting a source port number and a destination port number. Then the user equipment associates an inverted IP 5-tuple with a service identifier of the uplink data of the service, and the identifier of the uplink data is the same as the identifier of the downlink data. Finally, the user equipment determines the QoS parameter corresponding to the service identifier of the downlink data as a QoS parameter corresponding to the service identifier of the uplink data.

In this way, after determining, in an inversion manner, the service identifier of the uplink data and the QoS parameter corresponding to the service identifier of the uplink data, the user equipment may reference the second feasible solution to determine, based on the table of the mapping relationship between a QoS parameter and a transmission class, a transmission class corresponding to the service identifier, and further determine, based on a correspondence between a service identifier and an LCH, a transmission class corresponding to an LCH. The correspondence between a service identifier and an LCH means that an LCH on which uplink data of a service indicated by a service identifier is an LCH corresponding to the service identifier.

In a fourth feasible solution, the user equipment may determine a transmission class based on an indication identifier in to-be-transmitted uplink data. The user equipment obtains indication identifiers that are set for uplink data on an LCH and that are in some fields of an IP layer protocol header, and then determines a transmission class of the LCH based on a table of a mapping relationship between an indication identifier and a transmission class.

For example, indication identifiers may be set in some fields of the IP layer protocol header of the uplink data, for example, different values of a differentiated services code point (DSCP) are corresponding to different transmission classes. For example, it is set that 000 represents a low transmission class, 010 represents a medium transmission class, and 110 represents a high transmission class.

Further, based on the foregoing four feasible solutions or in a solution to notifying a transmission class of a service in another form, the first information may further include a parameter of prioritized bit rate (PBR) resources of a service.

203. The user equipment sends second information to the radio access device, where the second information indicates an amount of the to-be-sent uplink data on the at least one logical channel corresponding to at least one transmission class in the different transmission classes.

The user equipment may report an amount of to-be-sent uplink data on an LCH corresponding to each transmission class in the different transmission classes, or the user equipment may report amounts of to-be-sent uplink data on LCHs corresponding to several transmission classes in the different transmission classes.

Optionally, it is assumed that any transmission class in the different transmission classes is a target transmission class. If the target transmission class is corresponding to one LCH, an amount of to-be-sent uplink data is an amount of uplink data on the LCH; or if the target transmission class is corresponding to a plurality of LCHs, an amount of to-be-sent uplink data is a total amount of uplink data on the plurality of LCHs.

Optionally, before step 203 in which the user equipment sends the second information to the radio access device is performed, step 202 may be further performed, that is, the user equipment receives fourth information sent by the radio access device. Details are as follows.

In a first feasible solution, the fourth information is used to instruct the user equipment to report a transmission class of an LCH having an amount of to-be-sent uplink data. The fourth information may be used to instruct the user equipment to report the amount of to-be-sent uplink data based on a transmission class. After receiving the fourth information, the user equipment separately collects statistics about amounts of to-be-sent uplink data on LCHs of transmission classes in the user equipment. In this way, the second information sent by the user equipment may include a plurality of transmission classes and an amount of to-be-sent uplink data of each transmission class.

In a second feasible solution, the fourth information is used to instruct the user equipment to report a transmission class of an LCH having an amount of to-be-sent uplink data. The fourth information may be used to instruct to report a target transmission class of the amount of to-be-sent uplink, for example, instruct the user equipment to report amounts of to-be-sent uplink data of several transmission classes, or report an amount of to-be-sent uplink data on an LCH of a relatively high transmission class. The user equipment collects statistics about amounts of to-be-sent uplink data on LCHs of transmission classes that are notified by the user equipment. In this way, the second information sent by the user equipment includes the amounts of to-be-sent uplink data of the transmission classes, and optionally may further include the transmission classes.

In a third feasible solution, the fourth information indicates a first location index of each transmission class in the at least one transmission class, and the first location index is used to identify a location, in the second information, of an amount of to-be-sent uplink data of each transmission class in the at least one transmission class. After receiving the fourth information, the user equipment determines, based on a correspondence between a location index and a transmission class, a first transmission class corresponding to the first location index, and then collects statistics about amounts of to-be-sent uplink data on LCHs of the first transmission class in the user equipment. In this way, the amounts of to-be-sent uplink data are written at a location that is corresponding to the first location index and that is in the second information sent by the user equipment. In another possible implementation, a transmission class of a service is represented in a manner in which the radio access device configures a location index for the user equipment. In other words, different location indexes represent different transmission classes. Therefore, after receiving the fourth information, the user equipment collects statistics about amounts of to-be-sent uplink data based on the first location index and reports the amounts of to-be-sent uplink data based on the first location index, and writes the amounts of to-be-sent uplink data at the location that is corresponding to the first location index and that is in the second information. This can save a transmission bit, and improve data transmission efficiency.

In a fourth feasible solution, the fourth information may be used to instruct the user equipment to report an amount of to-be-sent uplink data based on a logical channel group (LCG). One LCG includes one or more LCHs, and the radio access device notifies the user equipment of the LCG and the LCH included in the LCG After receiving the first information, the user equipment separately collects statistics about a total amount of to-be-sent uplink data corresponding to each LCG and the total amount of to-be-sent uplink data is a sum of amounts of to-be-sent uplink data on all LCHs included in the LCG Correspondingly, the radio access device receives the second information.

204. The radio access device allocates a transmission format and transmission resources in the transmission format to the at least one logical channel based on the second information.

After receiving the second information, the radio access device searches available transmission resources for transmission resources corresponding to a transmission class determined based on the second information.

It may be understood that in this embodiment of this application, that second information indicating one or more transmission classes of one user equipment is received is used as an example. In actual application, the radio access device may receive second information indicating a plurality of transmission classes of a plurality of user equipments. In this case, when allocating transmission resources, the radio network device comprehensively considers factors such as a total quantity of currently unused transmission resources and a quantity of transmission resources required by each user equipment, to allocate a specific quantity of transmission resources to the transmission class indicated in the second information of the user equipment in this embodiment.

Optionally, the radio access device may allocate a specific quantity of transmission resources to an LCH corresponding to each transmission class indicated in the second information, or allocate a specific quantity of transmission resources to LCHs corresponding to several transmission classes in the plurality of transmission classes indicated in the second information.

In this embodiment of this application, the transmission format may include but is not limited to a TTI format, an MCS format, a HARQ configuration, an MIMO configuration, beam resources, and a Numerology. The Numerology means that configuration parameters used for OFDM are different at a physical layer. For example, the configuration parameters are different in terms of at least one of: a subcarrier spacing and a guard prefix length. As a result, time-frequency resources included in an RE are different from time-frequency resources included in an RB. The transmission resources are physical time-frequency resources, may be represented in a form of an RE, an RB, or the like, and may further include transmission resources such as HARQs at MAC layer. For example, in an LTE system, one subcarrier in frequency domain and one symbol in time domain may be referred to as one RE. 12 consecutive subcarriers in frequency domain and one slot in time domain may be referred to as one RB. A representation format of the physical time-frequency resources is not limited herein.

205. The radio access device sends third information to the user equipment, where the third information indicates the transmission format used for the uplink data on the at least one logical channel corresponding to the at least one transmission class in the different transmission classes, and indicates the transmission resources in the transmission format.

In a feasible solution, each transmission class in the at least one transmission class in the third information is indicated in an explicit manner or an implicit manner.

When each transmission class in the at least one transmission class is indicated in the third information in an explicit manner, the third information carries each transmission class in the at least one transmission class, a transmission format corresponding to each transmission class, and transmission resources in the transmission format corresponding to the transmission class.

When each transmission class in the at least one transmission class is indicated in the third information in an implicit manner, the third information includes a transmission format corresponding to each transmission class in the at least one transmission class, and includes transmission resources in the transmission format corresponding to the transmission class.

A feasible solution to using an implicit manner is as follows: Each transmission class is indicated by using a second location index corresponding to the transmission class, and the second location index is used to identify the transmission format corresponding to each transmission class in the at least one transmission class and a location, in the third information, of the transmission resources in the transmission format corresponding to the transmission class. In the third information, the radio access device may write, at a location indicated by the second location index corresponding to the transmission class and based on a table of a mapping relationship between a second location index and a transmission class, the transmission format corresponding to each transmission class, and the transmission resources in the transmission format corresponding to the transmission class.

Another feasible solution to using an implicit manner is as follows: Each transmission class is indicated by using a format of transmission resources corresponding to the transmission class, and the third information includes the transmission format corresponding to each transmission class in the at least one transmission class, and includes the transmission resources in the transmission format corresponding to the transmission class. The radio access device may add, to the third information based on a table of a mapping relationship between a transmission format and a transmission class, the transmission format corresponding to each transmission class, and the transmission resources in the transmission format corresponding to the transmission class.

It may be understood that for transmission formats used for uplink data on LCHs corresponding to a same transmission class, and transmission resources in the transmission formats, third information generated in an implicit manner occupies fewer bits than third information generated in an explicit manner.

Correspondingly, the user equipment receives the third information sent by the radio access device.

206. The user equipment determines the transmission format of the uplink data on the at least one logical channel corresponding to the at least one transmission class in the different transmission classes, and determines the transmission resources in the transmission format.

The user equipment determines, based on the received third information, the transmission format of the uplink data on the at least one LCH corresponding to the at least one transmission class in the different transmission classes, and determines the transmission resources in the transmission format.

When each transmission class in the at least one transmission class is indicated in the third information in an explicit manner, the user terminal may directly determine the transmission format corresponding to each transmission class in the at least one transmission class, and determine the transmission resources in the transmission format corresponding to the transmission class, and then determine, based on an LCH corresponding to each transmission class in the at least one transmission class, a transmission format used for uplink data on each LCH and determine transmission resources in the transmission format.

When each transmission class in the at least one transmission class is indicated in the third information in an implicit manner, if the transmission class is indicated by using the second location index, the user terminal first determines the location at which the transmission format and the transmission resources in the transmission format are located in the third information, determines a target location index of the location, and then determines, based on the table of the mapping relationship between a second location index and a transmission class, a target transmission class corresponding to the target location index, so as to determine a transmission format used for uplink data on an LCH of the target transmission class and determine transmission resources in the transmission format.

When each transmission class in the at least one transmission class is indicated in the third information in an implicit manner, if the transmission class is indicated by using the transmission format, the user terminal first determines a target transmission format included in the third information, and then determines, based on the table of the mapping relationship between a transmission format and a transmission class or according to an internal algorithm of the user equipment, a target transmission class corresponding to the target transmission format, so as to determine a transmission format used for uplink data on an LCH of the target transmission class and determine transmission resources in the transmission format.

207. The user equipment sends the uplink data by using the transmission format and the transmission resources in the transmission format.

Specifically, in the transmission format of the uplink data on the at least one LCH corresponding to the at least one transmission class and the transmission resources in the transmission format that are determined by the user equipment in step 206, it is assumed that any transmission class in the at least one transmission class is the target transmission class, and the uplink data on the LCH corresponding to the target transmission class is a plurality of uplink data packets. The target transmission class may be corresponding to one LCH, or may be corresponding to a plurality of LCHs. Further, the plurality of uplink data packets may be related to one service, or may be related to a plurality of services. Optionally, the uplink data packet also has at least one of: a corresponding reliability class, delay class, and service priority. That the uplink data is sent by using the transmission format and the transmission resources in the transmission format is described in detail in the following several cases.

In a first feasible solution, when there is one uplink data packet on the LCH corresponding to the target transmission class, the user equipment sends the uplink data packet in a transmission format corresponding to the target transmission class, and transmission resources in the transmission format.

In a second feasible solution, when there are a plurality of uplink data packets on the LCH corresponding to the target transmission class, the user equipment preferentially allocates more transmission resources to an uplink data packet with a high priority in the plurality of uplink data packets. The priority may be at least one of: a reliability class, a delay class, and a service priority.

For example, the plurality of uplink data packets include an uplink data packet 1, an uplink data packet 2, and an uplink data packet 3. A service priority of the uplink data packet 1 is 2, a service priority of the uplink data packet 2 is 3, and a service priority of the uplink data packet 3 is 5. It is set that a smaller value of a service priority indicates a higher service priority. After determining transmission resources, the user equipment preferentially allocates, to the uplink data packet 1, the transmission resources in the transmission format corresponding to the target transmission class.

In a third feasible solution, when there are a plurality of uplink data packets on the LCH corresponding to the target transmission class, the user equipment allocates a preset proportion of transmission resources to each of the plurality of uplink data packets. Optionally, if the transmission resources have remaining resources after the preset proportion of transmission resources are allocated, the user equipment may continue to allocate the remaining resources. For example, the user equipment preferentially allocates more transmission resources to an uplink data packet with a high priority in unsent uplink data packets in the plurality of uplink data packets.

For example, the plurality of uplink data packets include an uplink data packet 1, an uplink data packet 2, and an uplink data packet 3. A service priority of the uplink data packet 1 is 2, a service priority of the uplink data packet 2 is 3, and a service priority of the uplink data packet 3 is 5. It is set that a smaller value of a service priority indicates a higher service priority. If transmission resources corresponding to the target transmission class that are received by the user equipment are 100 Kbytes, the user equipment may allocate 20 Kbytes to the uplink data packet 1, allocate 15 Kbytes to the uplink data packet 2, and allocate 15 Kbytes to the uplink data packet 3, and there are still 50 Kbytes remaining after transmission resources are allocated to each uplink data packet. During remaining resource allocation, the user equipment preferentially allocates resources to the uplink data packet 1 with a high priority. After a resource requirement of the uplink data packet 1 is met, the user equipment starts to allocate resources to the uplink data packet 2 in a priority sequence, for example, continues to allocate 40 Kbytes to the uplink data packet 1, and allocate 10 Kbytes to the uplink data packet 2.

A case in which the transmission resources in the transmission format corresponding to the target transmission class are used for a plurality of uplink data packets of a same transmission class is described above in detail, and transmission resource usage for different transmission classes is described below in detail.

If the user equipment determines that the third information includes transmission formats used for uplink data on LCHs corresponding to at least two transmission classes, and transmission resources in the transmission formats, where it is assumed that the third information includes first transmission resources of a first transmission class and second transmission resources of a second transmission class, after the user equipment allocates the first transmission resources to uplink data packets on an LCH of the first transmission class, when the first transmission resources have remaining resources, the user equipment may first allocate the remaining resources in the first transmission resources to uplink data packets on an LCH of the second transmission class.

Further, for a retransmitted uplink data packet in the uplink data packets on the LCH of the second transmission class, the user equipment may preferably use unused transmission resources in the first transmission resources. For example, the first transmission resources may use a shorter TTI and a shorter HARQ round trip time (RTT) than the second transmission resources, to implement a larger quantity of retransmissions during a same time, thereby improving transmission robustness. A lower-order MCS may alternatively be used to improve transmission robustness and decrease a bit error rate.

When the second transmission class of the uplink data packet on the LCH of the second transmission class is lower than the first transmission class of a first type of uplink data packet, high-class transmission resources may be preferably used to transmit the uplink data packet of the lower transmission class. This reduces waste of the high-class transmission resources.

Further, if the unused transmission resources in the first transmission resources are fewer than transmission resources required by the uplink data packets on the LCH of the second transmission class, the user equipment first transmits, on the unused transmission resources in the first transmission resources, some of the uplink data packets on the LCH of the second transmission class, and then uses the second transmission resources to send a remaining uplink data packet in the uplink data packets on the LCH of the second transmission class.

Further, if the uplink data packets of the first transmission class require resources more than the first transmission resources, after all the first transmission resources are allocated to the uplink data packets on the LCH of the first transmission class, an uplink data packet that is on the LCH of the first transmission class and to which transmission resources are not allocated continues to be reserved in a buffer and waits for allocation of transmission resources in next first transmission resources provided by the radio access device.

Further, if the transmission class includes only the delay class, a service of a transmission class may use transmission resources of a transmission class higher than the transmission class of the service, so as to increase a transmission speed, and reduce a transmission delay.

208. When discarding a target data packet in the uplink data, the user equipment notifies, by using an RLC layer, an RLC layer of the radio access device of an identifier of the target data packet.

Specifically, in a process in which the user equipment sends uplink data on a target logical channel, where the target logical channel is a logical channel in the at least one logical channel, when the uplink data includes a plurality of uplink data packets, the target data packet is any one of the plurality of uplink data packets.

In a first case, a packet data convergence protocol (PDCP) layer entity of the user equipment sets a timer for the target data packet, and if the timer expires, the target data packet may be discarded. The PDCP layer entity of the user equipment notifies a radio link control (RLC) layer entity of an identifier of the discarded uplink data packet, and the identifier is a serial number (SN) of a PDCP PDU. The RLC layer entity of the user equipment notifies an RLC layer entity of the radio access device of the identifier of the uplink data packet, and the identifier is an RLC PDU SN.

Optionally, the RLC layer entity may continue to use an SN allocated by the PDCP layer entity.

In a second case, if a timer that is of the target data packet and that is in an RLC layer entity expires, the user equipment discards the target data packet in the RLC layer entity, and notifies, by using the RLC layer entity, an RLC layer entity of the radio access device of an identifier of the uplink data packet. The identifier is an RLC PDU SN. The RLC layer entity of the radio access device may be notified by using an RLC control PDU.

In a third case, if a timer that is of the target data packet and that is in a media access control (MAC) layer entity expires, the user equipment discards the target data packet in the MAC layer entity. The MAC layer entity notifies an RLC layer of an identifier of the discarded uplink data packet, and notifies, by using an RLC layer entity, an RLC layer entity of the radio access device of the identifier of the uplink data packet. The identifier is an RLC PDU SN.

For the foregoing three cases, after notifying the RLC layer entity of the radio access device of the identifier of the discarded uplink data packet, the RLC layer entity of the user equipment further moves a sending window to send a data packet following the discarded target data packet.

Further, step 208 describes a case in which for the target data packet in the uplink data, the user equipment sends the identifier of the discarded target data packet to the radio access device. In addition, downlink data (namely, data sent by the radio access network device to the user equipment) may also be notified in the foregoing manner. Next, a transmit end and a receive end are used for description. When the user equipment is the transmit end, the radio access device is the receive end. When the user equipment is the receive end, the radio access device is the transmit end. After receiving an identifier of a discarded target data packet, the receive end no longer waits to receive the target data packet discarded by the transmit end, and the receive end modifies a receiving window and continues to receive a subsequent data packet. In an RLC AM mode, in a solution to notifying the identifier of the discarded target data packet, when an RLC entity of the receive end has a target data packet that is not received in the receiving window, the RLC entity of the receive end does not keep waiting. In this case, the receiving window of the receive end is moved, so as to ensure that a subsequent data packet can be sent and received. After the transmit end sends the identifier of the discarded target data packet, the RLC layer entity of the transmit end moves a sending window to send a data packet following the discarded target data packet.

In this embodiment of this application, the timer is configured by the radio access network device, and timers of different protocol layers are configured for an LCH in the user equipment, including at least one of: a PDCP layer, an RLC layer, and a MAC layer. A timer of the protocol layer is started when a data packet enters the protocol layer.

Further, one implementation is expiration determining of the timer at the protocol layer, and a processing delay of the data packet in an upper-layer protocol is considered. For example, expiration determining of a timer at the RLC layer depends on a processing delay of the data packet at the PDCP layer. If timer duration is set to 10 s, and the processing delay of the data packet at the PDCP layer is 3 s, timer duration at the RLC layer may be calculated as follows: (10 s−3 s)=7 s. Likewise, a timer at the MAC layer considers processing delays at the PDCP layer and the RLC layer.

In another implementation, different timers may be set for different data packets of a same service. For example, a video service includes an intra-prediction (I) frame and a prediction (P) frame. The I frame represents a key frame, and when data in the I frame is decoded, only the data in the I frame is required to reconstruct a complete image. The P frame represents a difference between a current frame and a previous frame (for example, the previous frame is the I frame or the P frame), and when the P frame is decoded, data in the previous frame and data in the current frame that are buffered need to be used to reconstruct a complete image. In this case, different timers may be set for the I frame and the P frame. For example, a timer with relatively long duration is set for the I frame, and a timer with relatively short duration is set for the P frame. The core network device or the radio access network device may notify the user equipment of a value of the timer.

Further, in a scenario in which different timers may be set for different data packets of a same service, a timer may be started when processing of a previous type of data packet in the same service is completed at a protocol layer. For example, after processing in the I frame at the RLC layer is completed, timers for all P frames between the I frame and a next I frame are started. If the timer expires, all the P frames between the I frame and the next I frame are discarded.

This solution may be used for a service in which RLC uses an acknowledged mode (AM) or an unacknowledged mode (UM).

For the UM mode, in an implementation, if a receive end in the UM is still in a receiving window after a reordered timer expires, the receive end may send retransmission information to a transmit end. The retransmission information includes a serial number of a packet that needs to be retransmitted, and the transmit end is required to retransmit the packet.

The implementation solution may be used for an uplink data packet and a downlink data packet. For the downlink data packet, the RLC layer entity of the radio access device notifies the RLC layer entity of the user equipment of the identifier of the discarded uplink data packet.

In the solution provided in this embodiment of this application, after receiving the first transmission resources of the uplink data on the first LCH of the first transmission class and the second transmission resources of the uplink data on the second LCH of the second transmission class, the user equipment may further determine a resource allocation sequence for the uplink data based on a service priority and a reliability class of the uplink data.

If the first transmission class is determined based on at least one of: the reliability class and a delay class of the uplink data on the first LCH, and the second transmission class is also determined based on at least one of: the reliability class and a delay class of the uplink data on the second LCH, after receiving the first transmission resources corresponding to the first transmission class and the second transmission resources corresponding to the second transmission class, the user equipment may allocate the resources first based on a service priority and then based on a transmission class. For example, for an uplink data packet 1 on the first LCH, a service priority is 2, a transmission class is 2, and prioritized bits are 20 kbytes; and for an uplink data packet 2, a service priority is 1, a transmission class is 3, and a prioritized bit rate are 20 kbytes. It is set that a smaller value of a service priority indicates a higher service priority. After transmission resources of the transmission class 2 and the transmission class 3 are received, the transmission resources are scheduled in a service priority sequence. First, transmission resources corresponding to the transmission class 3 are allocated to the uplink data packet 2, and 20 Kbytes are allocated to the uplink data packet 2. Then transmission resources corresponding to the transmission class 2 are allocated to the uplink data packet 1, and 10 kbytes are allocated to the uplink data packet 1. Next, the transmission resources corresponding to the transmission class 3 are selected for remaining data in the uplink data packet 2. If the transmission resources corresponding to the transmission class 3 are insufficient, the transmission resources corresponding to the transmission class 2 may be selected. If the uplink data packet 1 still has remaining data, transmission resources are allocated to the remaining data during next scheduling.

Alternatively, resources may be allocated based on first a transmission class and then a service priority. For example, for an uplink data packet 1, a service priority is 2, a transmission class is 2, and a prioritized bit rate are 10 kbytes; and for an uplink data packet 2, a service priority is 1, a transmission class is 3, and a prioritized bit rate are 20 kbytes. It is set that a smaller value of a service priority indicates a higher service priority. After transmission resources of the transmission class 2 and the transmission class 3 are received, the transmission resources are allocated in a transmission class sequence. First, transmission resources corresponding to the transmission class 2 are allocated to the uplink data packet 1, and 10 Kbytes are allocated to the uplink data packet 1. Then transmission resources corresponding to the transmission class 3 are allocated to the uplink data packet 2, and 20 Kbytes are allocated to the uplink data packet 2. Next, the transmission resources corresponding to the transmission class 2 are selected for remaining data in the uplink data packet 1. If the transmission resources corresponding to the transmission class 2 are insufficient, transmission resources are allocated to the remaining data during next scheduling. If the uplink data packet 2 still has remaining data, transmission resources are allocated to the remaining data during next scheduling.

If the first transmission class is determined based on a service priority, a delay class, and a reliability class of an uplink data packet on the first LCH, and the second transmission class is also determined based on a service priority, a delay class, and a reliability class of an uplink data packet on the second LCH, after receiving the first transmission resources corresponding to the first transmission class and the second transmission resources corresponding to the second transmission class, the user equipment determines a resource allocation sequence based on the transmission class, and completes allocation in the resource allocation sequence. For example, for an uplink data packet 1 on the first LCH, a transmission class is 2 and a prioritized bit rate are 10 kbytes; and for an uplink data packet 2 on the second LCH, a transmission class is 3 and a prioritized bit rate are 20 kbytes. In this case, a sequence in which the user equipment allocates resources to the uplink data packet 1 and the uplink data packet 2 is the uplink data packet 1 first and then the uplink data packet 2. First, resources are allocated to the uplink data packet 1. Transmission resources corresponding to the transmission class 2 are selected, and 10 Kbytes are allocated to the uplink data packet 1. Then resources are allocated to the uplink data packet 2. Transmission resources corresponding to the transmission class 3 are selected, and 20 Kbytes are allocated to the uplink data packet 2. Next, the transmission resources corresponding to the transmission class 2 are selected for remaining data in the uplink data packet 1. If the transmission resources corresponding to the transmission class 2 are insufficient, transmission resources are allocated to the remaining data during next scheduling. If the remaining transmission resources of the transmission class 2 have remaining resources, the remaining resources may be allocated to the uplink data packet 2. If the uplink data packet 2 still has remaining data, transmission resources are allocated to the remaining data during next scheduling.

In this embodiment of this application, different logical channels in the user equipment are corresponding to different transmission classes. In a process of transmitting uplink data on a logical channel, the user equipment transmits the uplink data by using a transmission format used for the uplink data on the logical channel corresponding to the transmission class, and transmission resources in the transmission format. However, the transmission class includes at least one of: a reliability class and a delay class of the service, and optionally may further include a service priority; or the transmission class is determined based on at least two of a service priority, a reliability class, and a delay class of a service. Therefore, transmission resources used for uplink data that are determined based on transmission classes implement that different transmission resources are allocated to uplink data on LCHs of different transmission classes, and can meet different requirements of different uplink data, thereby improving data transmission flexibility, improving user experience, and increasing network resource utilization.

Figure 4:
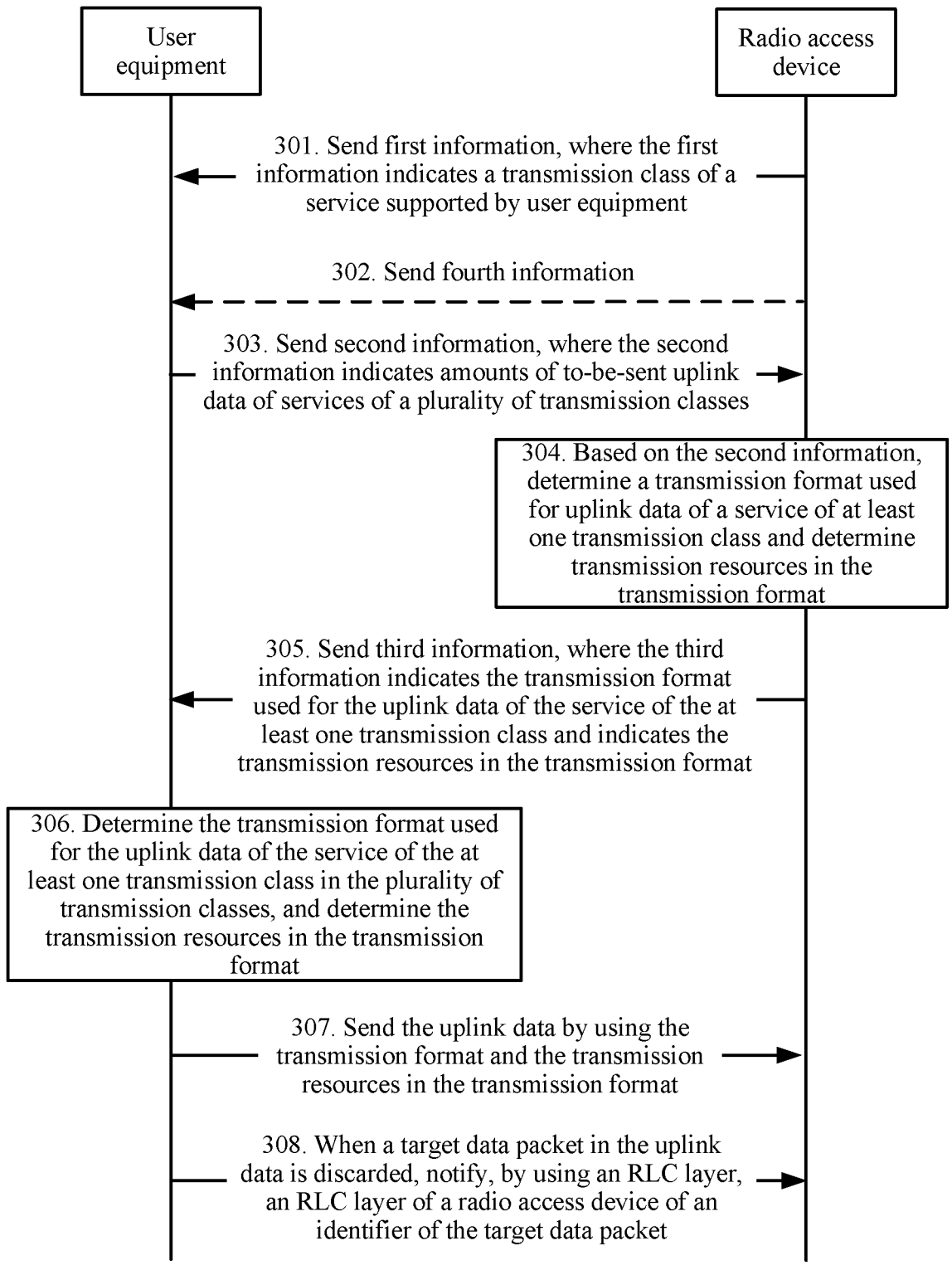
FIG. 4 is a schematic flowchart of another data transmission method according to an embodiment of this application.

FIG. 4 is a schematic flowchart of another data transmission method according to an embodiment of this application. As shown in FIG. 4, the data transmission method in this embodiment of this application includes step 301 to step 308. The data transmission method in this embodiment of this application is performed through interaction between user equipment and a radio access device. In this embodiment of this application, a transmission class is a transmission class of a service sent by the user equipment. For a specific process, refer to the following detailed descriptions.

301. The radio access device sends first information to the user equipment, where the first information indicates a transmission class of a service supported by the user equipment.

The first information notifies the user equipment of the transmission class of the service supported by the user equipment. The transmission class includes at least one of: a reliability class and a delay class of the service, and optionally may further include a service priority. Alternatively, the transmission class is determined based on at least two of a service priority, a reliability class, and a delay class of the service; or the transmission class is determined based on at least two of parameters such as a priority, a reliability requirement, and a delay requirement of the service.

The reliability class of the service is a requirement class of the service for transmission reliability.

The delay class of the service is a requirement class of the service for a transmission delay. Optionally, the transmission delay is a transmission time for transmitting a service packet from the user equipment to a core network device, or the transmission delay is a transmission time for transmitting a service packet from the user equipment to the radio access device. The transmission delay may be determined by subtracting an estimated transmission time for transmitting the service packet from the radio access device to the core network device from the transmission time for transmitting the service packet from the user equipment to the core network device.

The service priority is a relative class for scheduling a service packet.

It may be understood that determining the transmission class based on the reliability class of the service and the delay class of the service is generating a transmission class based on the reliability class and the delay class of the service. In one solution, the transmission class may be obtained in a weighting manner of performing a weighting operation on the reliability class and the delay class. If the reliability class is 1, the delay class is 2, and weighting coefficients are respectively 40% and 60%, a transmission class value is 1.6. Alternatively, in another solution, the transmission class may be generated by using a pre-configured relationship between a transmission class and each of a reliability class and a delay class. If the reliability class is 1, and the delay class is 2, the transmission class obtained based on the pre-configured relationship is 3.

Optionally, different transmission classes of a plurality of services may be transmitted for a plurality of times. For example, a transmission class of one service is sent at a time, or transmission classes of at least two services are sent at a time. In this way, the radio access device may send the different transmission classes of the plurality of services for a plurality of times. Further, the first information may include a transmission class of one or more services.

In this embodiment, for example, a relationship between a logical channel and a transmission class of the service supported by the user equipment is shown in Table 2. One logical channel in a logical channel group bears at least one service, and services on this logical channel may be corresponding to different transmission classes.

TABLE 2

| Logical channel group A | Logical channel a | Service a | Transmission class a |
|---|---|---|---|
| | | Service b | Transmission class b |
| | Logical channel b | Service c | Transmission class c |
| Logical channel group B | Logical channel c | Service d | Transmission class d |
| | | Service e | Transmission class e |
| ... | ... | ... | ... |

Optionally, the service in this embodiment of this application may be a group of data flows (QoS flow) having a same QoS parameter.

It should be noted that a transmission class of a service may be determined based on each class parameter of the service by using a method the same as a method for determining, based on each class parameter of a service, a transmission class of an LCH on which uplink data of the service is located. Therefore, for a specific calculation manner in which the transmission class of the service is determined based on each class parameter of the service, refer to specific descriptions in the embodiment shown in FIG. 3. Details are not described herein again.

In a first feasible solution, the first information sent by the radio access device to the user equipment is a service identifier and a transmission class corresponding to the service identifier. The service identifier may be a TFT or a flow ID that is corresponding to a service, or a QoS identifier of a service. For example, there are three transmission classes such as a high class, a medium class, and a low class. If a value is used to represent a transmission class, the transmission class sent by the radio access device may be represented by setting a value, for example, 1, 2, 3, ..., N, where 1 represents a highest class, and N represents a lowest class.

Optionally, in the first feasible solution, when the radio access device or the core network does not send a QoS parameter of a service to the user equipment, the radio access device or the core network device may directly send a service identifier and a transmission class corresponding to the service identifier, to notify the user equipment of a transmission class of each service.

In a second feasible solution, when the radio access device sends a QoS parameter of a service to the user equipment, the first information sent by the radio access device to the user equipment is a service identifier of uplink data and a QoS parameter corresponding to the service identifier of the uplink data. After receiving the service identifier of the uplink data and the QoS parameter corresponding to the service identifier of the uplink data that are sent by the radio access device, the user equipment determines, based on a table of a mapping relationship between a QoS parameter and a transmission class, a transmission class corresponding to a service indicated by the service identifier. Optionally, the core network device notifies the radio access device of the QoS. The radio access device may preset the table of the mapping relationship between a QoS parameter and a transmission class, and notify the user equipment of the mapping relationship table, so that the user equipment determines a transmission class of each service by using the table of the mapping relationship between a QoS parameter and a transmission class.

The QoS parameter includes one or more of parameters such as a priority, a packet loss rate, a transmission delay, and a rate.

In a third feasible solution, when the radio access device sends a QoS parameter of a service to the user equipment, and a QoS parameter of uplink data of the service is the same as a QoS parameter of downlink data, the first information sent by the radio access device to the user equipment is a service identifier of the downlink data and a QoS parameter corresponding to the service identifier of the downlink data.

After receiving the service identifier of the downlink data and the QoS parameter corresponding to the service identifier of the downlink data, the user equipment first obtains an IP 5-tuple of the downlink data of the service, and obtains an IP 5-tuple of the uplink data of the service by inverting IP 5-tuple information of the downlink data. The IP 5-tuple includes a source IP address, a source port, a destination IP address, a destination port, and a transport layer protocol. An inversion function may be implemented by inverting the source IP address and the destination IP address, and inverting a source port number and a destination port number. Then the user equipment associates an inverted IP 5-tuple with a service identifier of the uplink data of the service, and the identifier of the uplink data is the same as the identifier of the downlink data. Finally, the user equipment determines the QoS parameter corresponding to the service identifier of the downlink data as the QoS parameter corresponding to the service identifier of the uplink data.

In the feasible solution, after determining the service identifier of the uplink data and the QoS parameter corresponding to the service identifier of the uplink data in an inversion manner, the user equipment may reference the second feasible solution to determine, based on the table of the mapping relationship between a QoS parameter and a transmission class, a transmission class corresponding to the service indicated by the service identifier.

In a fourth feasible solution, the user equipment may determine a transmission class based on an indication identifier in to-be-transmitted uplink data. Specifically, the user equipment obtains an indication identifier of uplink data at an application layer, and determines, based on a table of a mapping relationship between an indication identifier and a transmission class, a transmission class corresponding to the uplink data. The radio access device presets the table of the mapping relationship between an indication identifier and a transmission class, and notifies the user equipment of the mapping relationship table. In step 301, the first information may be the table of the mapping relationship between an indication identifier and a transmission class.

Further, based on the foregoing four feasible solutions or in a solution to notifying a transmission class of a service in another form, the first information may further include a parameter of PBR resources of a service.

Correspondingly, the user equipment receives the first information sent by the radio access device.

303. The user equipment sends second information to the radio access device.

The second information indicates amounts of to-be-sent uplink data of services of a plurality of transmission classes.

It should be noted that in actual application, to-be-sent uplink data in the user equipment needs to be transmitted through an LCH, and one LCH may transmit uplink data of one service or uplink data of a plurality of services. If all uplink data on one LCH is corresponding to a same transmission class, a transmission class of a service packet in this embodiment of this application is a transmission class of an LCH on which the service packet is located; or if all uplink data on one LCH is corresponding to a plurality of transmission classes, the second information is sent to the radio access device based on uplink data of different transmission classes in this embodiment of this application.

Optionally, before the user equipment performs step 303 to send the second information to the radio access device, the user equipment may further perform step 302, that is, the user equipment receives fourth information sent by the radio access device. Details are as follows.

In a first feasible solution, the fourth information is used to instruct the user equipment to report a transmission class of a service having an amount of to-be-sent uplink data. The fourth information may be used to instruct the user equipment to report the amount of to-be-sent uplink data based on a transmission class. After receiving the fourth information, the user equipment separately collects statistics about amounts of to-be-sent uplink data of services of transmission classes in the user equipment. In this way, the second information sent by the user equipment may include a plurality of transmission classes and an amount of to-be-sent uplink data of each transmission class.

In a second feasible solution, the fourth information may be used to instruct to report a target transmission class of an amount of to-be-sent uplink data, for example, instruct the user equipment to report amounts of to-be-sent uplink data of services of several transmission classes. The user equipment collects statistics about amounts of to-be-sent uplink data of the transmission classes that are notified by the user equipment. In this way, the second information sent by the user equipment includes the amounts of to-be-sent uplink data of the transmission classes, and optionally may further include the transmission classes.

In a third feasible solution, the fourth information indicates a first location index of each transmission class in the at least one transmission class, and the first location index is used to identify a location, in the second information, of an amount of to-be-sent uplink data of a service of each transmission class in the at least one transmission class. After receiving the fourth information, the user equipment determines, based on a correspondence between a location index and a transmission class, a first transmission class corresponding to the first location index, and then collects statistics about amounts of to-be-sent uplink data of the first transmission class in the user equipment. In this way, the amounts of to-be-sent uplink data are written at a location that is corresponding to the first location index and that is in the second information sent by the user equipment. In another possible implementation, a transmission class of a service is represented in a manner in which the radio access device configures a location index for the user equipment. In other words, different location indexes represent different transmission classes. Therefore, after receiving the fourth information, the user equipment collects statistics about amounts of to-be-sent uplink data based on the first location index and reports the amounts of to-be-sent uplink data based on the first location index, and writes the amounts of to-be-sent uplink data at the location that is corresponding to the first location index and that is in the second information.

Correspondingly, the radio access device receives the second information. The radio access device may obtain amounts of to-be-sent uplink data of services of different transmission classes based on the received second information.

304. The radio access device, based on the second information, determines a transmission format used for uplink data of a service of at least one transmission class and determines transmission resources in the transmission format.

After receiving the second information, the radio access device searches available transmission resources for transmission resources corresponding to a transmission class determined based on the second information.

It may be understood that in this embodiment of this application, that one or more transmission classes of one user equipment is/are received is used as an example. In actual application, the radio access device may receive second information indicating a plurality of transmission classes of a plurality of user equipments. In this case, when allocating transmission resources, the radio network device comprehensively considers factors such as a total quantity of currently unused transmission resources and a quantity of transmission resources required by each user equipment, to allocate a specific quantity of transmission resources to the transmission class indicated in the second information of the user equipment in this embodiment.

Optionally, the radio access device may allocate a specific quantity of transmission resources to a service corresponding to each transmission class indicated in the second information, or allocate a specific quantity of transmission resources to services corresponding to several transmission classes in the plurality of transmission classes indicated in the second information.

In this embodiment of this application, the transmission format may include but is not limited to a TTI format, an MCS format, a HARQ configuration, an MIMO configuration, beam resources, and a Numerology. The Numerology means that configuration parameters used for OFDM are different at a physical layer. For example, the configuration parameters are different in terms of at least one of: a subcarrier spacing and a guard prefix length. As a result, time-frequency resources included in an RE are different from time-frequency resources included in an RB.

305. The radio access device sends third information to the user equipment, where the third information indicates the transmission format used for the uplink data of the service of the at least one transmission class and indicates the transmission resources in the transmission format.

It should be noted that for services of different transmission classes and LCHs of different transmission classes, the third information is indicated in a same explicit manner or a same implicit manner. Therefore, for step 305, refer to detailed descriptions of step 205 in the embodiment shown in FIG. 3. Details are not described herein again.

306. The user equipment determines the transmission format of the uplink data of the service of the at least one transmission class in the different transmission classes, and determines the transmission resources in the transmission format.

It should be noted that services of different transmission classes and LCHs of different transmission classes have a same determined transmission format and same transmission resources in the transmission format. Therefore, for step 306, refer to detailed descriptions of step 206 in the embodiment shown in FIG. 3. Details are not described herein again.

307. The user equipment sends the uplink data by using the transmission format and the transmission resources in the transmission format.

Specifically, in the transmission format of the uplink data of the at least one service corresponding to the at least one transmission class, and the transmission resources in the transmission format that are determined by the user equipment in step 306, it is assumed that any transmission class in the at least one transmission class is a target transmission class, and uplink data of a service corresponding to the target transmission class is a plurality of uplink data packets. The target transmission class may be corresponding to one service, or may be corresponding to a plurality of services. Further, the plurality of uplink data packets may be related to one service, or may be related to a plurality of services. Optionally, the uplink data packet also has at least one of: a corresponding reliability class, delay class, and service priority. That the uplink data is sent by using the transmission format and the transmission resources in the transmission format is described in detail in the following several cases.

In a first feasible solution, when there is one uplink data packet in the service corresponding to the target transmission class, the user equipment sends the uplink data packet in a transmission format corresponding to the target transmission class, and transmission resources in the transmission format.

In a second feasible solution, when there are a plurality of uplink data packets in the service corresponding to the target transmission class, the user equipment preferentially allocates more transmission resources to an uplink data packet with a high priority in the plurality of uplink data packets. The priority may be at least one of: a reliability class, a delay class, and a service priority.

For example, the plurality of uplink data packets include an uplink data packet 1, an uplink data packet 2, and an uplink data packet 3. A service priority of the uplink data packet 1 is 2, a service priority of the uplink data packet 2 is 3, and a service priority of the uplink data packet 3 is 5. It is set that a smaller value of a service priority indicates a higher service priority. After determining transmission resources, the user equipment preferentially allocates, to the uplink data packet 1, the transmission resources in the transmission format corresponding to the target transmission class.

In a third feasible solution, when there are a plurality of uplink data packets in the service corresponding to the target transmission class, the user equipment allocates a preset proportion of transmission resources to each of the plurality of uplink data packets. Optionally, if the transmission resources have remaining resources after the preset proportion of transmission resources are allocated, the user equipment may continue to allocate the remaining resources. For example, the user equipment preferentially allocates more transmission resources to an uplink data packet with a high priority in unsent uplink data packets in the plurality of uplink data packets.

For example, the plurality of uplink data packets include an uplink data packet 1, an uplink data packet 2, and an uplink data packet 3. A service priority of the uplink data packet 1 is 2, a service priority of the uplink data packet 2 is 3, and a service priority of the uplink data packet 3 is 5. It is set that a smaller value of a service priority indicates a higher service priority. If transmission resources corresponding to the target transmission class that are received by the user equipment are 100 Kbytes, the user equipment may allocate 20 Kbytes to the uplink data packet 1, allocate 15 Kbytes to the uplink data packet 2, and allocate 15 Kbytes to the uplink data packet 3, and there are still 50 Kbytes remaining after transmission resources are allocated to each uplink data packet. During remaining resource allocation, the user equipment preferentially allocates resources to the uplink data packet 1 with a high priority. After a resource requirement of the uplink data packet 1 is met, the user equipment starts to allocate resources to the uplink data packet 2 in a priority sequence, for example, continues to allocate 40 Kbytes to the uplink data packet 1, and allocate 10 Kbytes to the service 2.

A case in which the transmission resources in the transmission format corresponding to the target transmission class are used for a plurality of uplink data packets of a same transmission class is described above in detail, and transmission resource usage for different transmission classes is described below in detail.

If the user equipment determines that the third information includes transmission formats used for uplink data of services corresponding to at least two transmission classes, and transmission resources in the transmission formats, where it is assumed that the third information includes first transmission resources of a first transmission class and second transmission resources of a second transmission class, after the user equipment allocates the first transmission resources to uplink data packets of a service of the first transmission class, when the first transmission resources have remaining resources, the user equipment may first allocate the remaining resources in the first transmission resources to uplink data packets of a service of the second transmission class.

Further, for a retransmitted uplink data packet in the uplink data packet of the service of the second transmission class, the user equipment may preferably use unused transmission resources in the first transmission resources. For example, the first transmission resources may use a shorter TTI and a shorter HARQ round trip time than the second transmission resources, to implement a larger quantity of retransmissions during a same time, thereby improving transmission robustness. A lower-order MCS may alternatively be used to improve transmission robustness and decrease a bit error rate.

When the second transmission class of the uplink data packet of the service of the second transmission class is lower than the first transmission class of a first type of uplink data packet, high-class transmission resources may be preferably used to transmit the uplink data packet of the lower transmission class. This reduces waste of the high-class transmission resources.

Further, if the unused transmission resources in the first transmission resources are fewer than transmission resources required by the uplink data packets of the service of the second transmission class, the user equipment first transmits, on the unused transmission resources in the first transmission resources, some of the uplink data packets of the service of the second transmission class, and then uses the second transmission resources to send a remaining uplink data packet in the uplink data packets of the service of the second transmission class.

Further, if the uplink data packets of the first transmission class require resources more than the first transmission resources, after all the first transmission resources are allocated to the uplink data packets of the service of the first transmission class, an uplink data packet that is of the service of the first transmission class and to which transmission resources are not allocated continues to be reserved in a buffer and waits for allocation of transmission resources in next first transmission resources provided by the radio access device.

Further, if the transmission class includes only the delay class, a service of a transmission class may use transmission resources of a transmission class higher than the transmission class of the service, so as to increase a transmission speed, and reduce a transmission delay.

308. When discarding a target data packet in the uplink data, the user equipment notifies, by using an RLC layer, an RLC layer of the radio access device of an identifier of the target data packet.

In a process in which the user equipment sends uplink data of a target service, where the target service is any one of the at least one service, when the uplink data includes a plurality of uplink data packets, the target data packet is any one of the plurality of uplink data packets.

It should be noted that for services of different transmission classes and LCHs of different transmission classes, when a target data packet in uplink data is discarded, manners in which the RLC layer is used to notify the RLC layer of the radio access device of the identifier of the target data packet are the same. Therefore, for step 308, refer to detailed descriptions of step 208 in the embodiment shown in FIG. 3. Details are not described herein again.

In the solution provided in this embodiment of this application, after receiving the first transmission resources of uplink data of a first service of the first transmission class and the second transmission resources of uplink data of a second service of the second transmission class, the user equipment may further determine a resource allocation sequence for the uplink data based on a service priority and a reliability class of the uplink data.

If the first transmission class is determined based on at least one of: the reliability class and a delay class of the uplink data of the first service, and the second transmission class is also determined based on at least one of: the reliability class and a delay class of the uplink data of the second service, after receiving the first transmission resources corresponding to the first transmission class and the second transmission resources corresponding to the second transmission class, the user equipment may allocate the resources first based on a service priority and then based on a transmission class. For example, for an uplink data packet 1 of the first service, a service priority is 2, a transmission class is 2, and prioritized bits are 20 kbytes; and for an uplink data packet 2 of the second service, a service priority is 1, a transmission class is 3, and a prioritized bit rate are 20 kbytes. It is set that a smaller value of a service priority indicates a higher service priority. After transmission resources of the transmission class 2 and the transmission class 3 are received, the transmission resources are scheduled in a service priority sequence. First, transmission resources corresponding to the transmission class 3 are allocated to the uplink data packet 2, and 20 Kbytes are allocated to the uplink data packet 2. Then transmission resources corresponding to the transmission class 2 are allocated to the uplink data packet 1, and 10 kbytes are allocated to the uplink data packet 1. Next, the transmission resources corresponding to the transmission class 3 are selected for remaining data in the uplink data packet 2. If the transmission resources corresponding to the transmission class 3 are insufficient, the transmission resources corresponding to the transmission class 2 may be selected. If the uplink data packet 1 still has remaining data, transmission resources are allocated to the remaining data during next scheduling.

Alternatively, resources may be allocated based on first a transmission class and then a service priority. For example, for an uplink data packet 1, a service priority is 2, a transmission class is 2, and a prioritized bit rate are 10 kbytes; and for an uplink data packet 2, a service priority is 1, a transmission class is 3, and a prioritized bit rate are 20 kbytes. It is set that a smaller value of a service priority indicates a higher service priority. After transmission resources of the transmission class 2 and the transmission class 3 are received, the transmission resources are allocated in a transmission class sequence. First, transmission resources corresponding to the transmission class 2 are allocated to the uplink data packet 1, and 10 Kbytes are allocated to the uplink data packet 1. Then transmission resources corresponding to the transmission class 3 are allocated to the uplink data packet 2, and 20 Kbytes are allocated to the uplink data packet 2. Next, the transmission resources corresponding to the transmission class 2 are selected for remaining data in the uplink data packet 1. If the transmission resources corresponding to the transmission class 2 are insufficient, transmission resources are allocated to the remaining data during next scheduling. If the uplink data packet 2 still has remaining data, transmission resources are allocated to the remaining data during next scheduling.

If the first transmission class is determined based on a service priority, a delay class, and a reliability class of an uplink data packet of the first service, and the second transmission class is also determined based on a service priority, a delay class, and a reliability class of an uplink data packet of the second service, after receiving the first transmission resources corresponding to the first transmission class and the second transmission resources corresponding to the second transmission class, the user equipment determines a resource allocation sequence based on the transmission class, and completes allocation in the resource allocation sequence. For example, for an uplink data packet 1 of the first service, a transmission class is 2 and a prioritized bit rate are 10 kbytes; and for an uplink data packet 2 of the second service, a transmission class is 3 and a prioritized bit rate are 20 kbytes. In this case, a sequence in which the user equipment allocates resources to the uplink data packet 1 and the uplink data packet 2 is the uplink data packet 1 first and then the uplink data packet 2. First, resources are allocated to the uplink data packet 1. Transmission resources corresponding to the transmission class 2 are selected, and 10 Kbytes are allocated to the uplink data packet 1. Then resources are allocated to the uplink data packet 2. Transmission resources corresponding to the transmission class 3 are selected, and 20 Kbytes are allocated to the uplink data packet 2. Next, the transmission resources corresponding to the transmission class 2 are selected for remaining data in the uplink data packet 1. If the transmission resources corresponding to the transmission class 2 are insufficient, transmission resources are allocated to the remaining data during next scheduling. If the remaining transmission resources of the transmission class 2 have remaining resources, the remaining resources may be allocated to the uplink data packet 2. If the uplink data packet 2 still has remaining data, transmission resources are allocated to the remaining data during next scheduling.

In this embodiment of this application, different services in the user equipment are corresponding to different transmission classes. In a process of transmitting uplink data of a service, a user equipment transmits the uplink data by using a transmission format used for the uplink data of the service corresponding to the transmission class, and transmission resources in the transmission format. However, the transmission class includes at least one of: a reliability class and a delay class of the service, and optionally may further include a service priority; or the transmission class is determined based on at least two of a service priority, a reliability class, and a delay class of a service. Therefore, transmission resources used for uplink data that are determined based on transmission classes implement that different transmission resources are allocated to uplink data of services of different transmission classes, and can meet different requirements of different uplink data, thereby improving data transmission flexibility, improving user experience, and increasing network resource utilization.

It should be noted that with reference to cases shown in Table 1 and Table 2, the radio access device may indicate a logical channel on which services of a same transmission class of the user equipment are borne (in this case, one logical channel is corresponding to one type of transmission class, and different services may have a same transmission class). Alternatively, the radio access device may indicate that different services of the user equipment have different transmission classes, and the services of the different transmission classes may be borne on a same logical channel. Based on Table 1 and Table 2, the first information may include content in both Table 1 and Table 2, as shown in Table 3.

TABLE 3

| Logical channel group 1 | Logical channel 1 | Service 1 | Transmission class 1 |
|---|---|---|---|
| | | Service 2 | Transmission class 1 |
| | Logical channel 2 | Service 3 | Transmission class 2 |
| | Logical channel 3 | Service 4 | Transmission class 3 |
| | | Service 5 | Transmission class 3 |
| ... | ... | ... | ... |

TABLE 3-continued

| Logical channel group A | Logical channel a | Service a | Transmission class a |
|---|---|---|---|
| | | Service b | Transmission class b |
| | Logical channel b | Service c | Transmission class c |
| Logical channel group B | Logical channel c | Service d | Transmission class d |
| | | Service e | Transmission class e |
| ... | ... | ... | ... |

Figure 5:
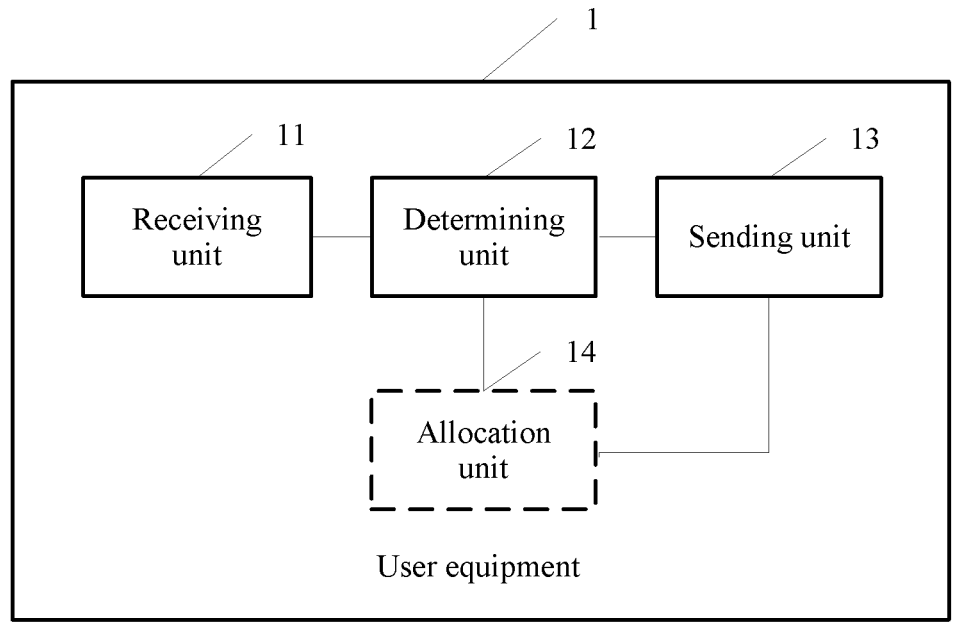
FIG. 5 is a schematic modular diagram of user equipment according to an embodiment of this application.

FIG. 5 is a schematic modular diagram of user equipment according to an embodiment of this application. The user equipment in this embodiment of this application may be the user equipment described in any of the method embodiments shown in FIG. 2 and FIG. 3. Therefore, repeated content in any of the method embodiments shown in FIG. 2 to FIG. 4 may not be described again in this embodiment.

As shown in FIG. 5, user equipment 1 in this embodiment of this application may include a receiving unit 11, a determining unit 12, and a sending unit 13. Optionally, the user equipment 1 further includes an allocation unit 14.

The receiving unit 11 is configured to receive first information sent by a radio access device. The first information indicates different transmission classes corresponding to a plurality of logical channels.

The determining unit 12 is configured to determine, based on the first information received by the receiving unit 11, a transmission format of uplink data on at least one logical channel corresponding to at least one transmission class in the different transmission classes, and determine transmission resources in the transmission format.

The sending unit 13 is configured to send the uplink data by using the transmission format and the transmission resources in the transmission format that are determined by the determining unit 12.

Optionally, the sending unit 13 is further configured to send second information to the radio access network device. The second information indicates an amount of the to-be-sent uplink data on the at least one logical channel corresponding to the at least one transmission class in the different transmission classes.

Optionally, the receiving unit 11 is further configured to: after the sending unit 13 sends the second information to the radio access device, receive third information sent by the radio access device. The third information indicates the transmission format used for the uplink data on the at least one logical channel corresponding to the at least one transmission class in the different transmission classes, and indicates the transmission resources in the transmission format.

Optionally, the at least one transmission class comprises all transmission classes in the different transmission classes.

Optionally, the at least one transmission class is a transmission class indicated by the radio access device in the different transmission classes.

Optionally, the receiving unit 11 is further configured to: before the sending unit 13 sends the second information, receive fourth information sent by the radio access device. The fourth information indicates a first location index of each transmission class in the at least one transmission class, and the first location index is used to identify a location, in the second information, of an amount of to-be-sent uplink data of each transmission class in the at least one transmission class.

Optionally, each transmission class in the at least one transmission class in the third information is indicated in an explicit manner or an implicit manner.

Optionally, that each transmission class in the at least one transmission class is indicated in the third information in an explicit manner is as follows: The third information carries each transmission class in the at least one transmission class, a transmission format corresponding to each transmission class, and transmission resources in the transmission format corresponding to the transmission class.

Optionally, that each transmission class in the at least one transmission class is implicitly indicated in the third information is as follows:

The third information includes a transmission format corresponding to each transmission class in the at least one transmission class, and includes transmission resources in the transmission format corresponding to the transmission class.

Each transmission class is indicated by using a second location index corresponding to the transmission class, and the second location index is used to identify the transmission format corresponding to each transmission class in the at least one transmission class and a location, in the third information, of the transmission resources in the transmission format corresponding to the transmission class; or each transmission class is indicated by using a format of transmission resources corresponding to the transmission class, and the third information includes the transmission format corresponding to each transmission class in the at least one transmission class, and includes the transmission resources in the transmission format corresponding to the transmission class.

Optionally, uplink data on each logical channel in the at least one logical channel is a plurality of uplink data packets, and the user equipment further includes:

an allocation unit 14, configured to: in a process of sending a plurality of uplink data packets, preferentially allocate more transmission resources to an uplink data packet with a high priority in the plurality of uplink data packets.

Optionally, the allocation unit 14 is further configured to allocate a preset proportion of transmission resources to each of the plurality of uplink data packets before preferentially allocating more transmission resources to the uplink data packet with a high service priority in the plurality of uplink data packets.

Optionally, in a process of sending uplink data on a target logical channel, where the target logical channel is a logical channel in the at least one logical channel, the sending unit 13 is further configured to: if a timer, at a PDCP layer, of a target data packet in the uplink data expires, discard the target data packet at the PDCP layer; and notify, by using an RLC layer, an RLC layer of the radio access device of an identifier of the target data packet.

Optionally, in a process of sending uplink data on a target logical channel, where the target logical channel is a logical channel in the at least one logical channel, the sending unit 13 is further configured to: if a timer, at an RLC layer, of a target data packet in the uplink data expires, discard the target data packet at the RLC layer; and notify, by using the RLC layer, an RLC layer of the radio access device of an identifier of the target data packet.

Optionally, in a process of sending uplink data on a target logical channel, where the target logical channel is a logical channel in the at least one logical channel, the sending unit 13 is further configured to: if a timer, at a MAC layer, of a target data packet in the uplink data expires, discard the target data packet at the MAC layer; and notify, by using an RLC layer, an RLC layer of the radio access device of an identifier of the target data packet.

Figure 6:
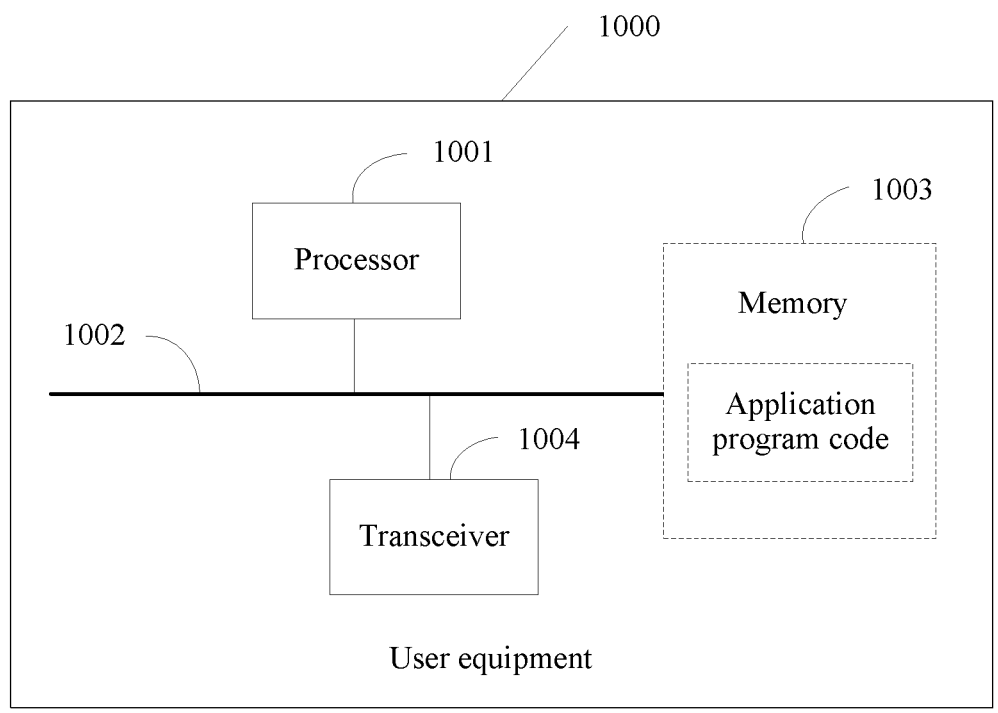
FIG. 6 is a schematic structural diagram of user equipment according to an embodiment of this application.

The user equipment in the embodiment shown in FIG. 5 may be implemented by using user equipment shown in FIG. 6. FIG. 6 is a schematic structural diagram of user equipment according to an embodiment of this application. User equipment 1000 shown in FIG. 6 includes a processor 1001 and a transceiver 1004. The processor 1001 and the transceiver 1004 are connected, for example, connected by using a bus 1002. Optionally, the user equipment 1000 may further include a memory 1003. It should be noted that there is at least one transceiver 1004 in actual application, and a structure of the user equipment 1000 constitutes no limitation on this embodiment of this application.

The processor 1001 is applied to this embodiment of this application, and is configured to implement functions of the determining unit 12 and the allocation unit 14 shown in FIG. 5. The transceiver 1004 includes a receiver and a transmitter. The transceiver 1004 is applied to this embodiment of this application, and is configured to implement functions of the receiving unit 11 and the sending unit 13 shown in FIG. 5.

The processor 1001 may be a central processing unit (CPU), a general purpose processor, digital signal processor (DSP), an application-specific integrated circuit (ASIC), a field-programmable logic gate array (FPGA) or another programmable logic device, a transistor logic device, a hardware component, or any combination thereof. The processor 1001 may implement or execute various example logical blocks, modules, and circuits described with reference to content disclosed in this application. Alternatively, the processor 1001 may be a combination of processors implementing a computing function, for example, a combination of one or more microprocessors, or a combination of a DSP and a microprocessor, and the like.

The bus 1002 may include a channel, used to transmit information between the foregoing components. The bus 1002 may be a peripheral component interconnect (PCI) bus or an extended industry standard architecture (EISA) bus, or the like. The bus 1002 may be classified into an address bus, a data bus, a control bus, and the like. For ease of representation, only one thick line is used to represent the bus in FIG. 6, but this does not mean that there is only one bus or only one type of bus.

The memory 1003 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto.

Optionally, the memory 1003 is configured to store application program code for executing the solutions of this application, and the processor 1001 controls execution of the solutions of this application. The processor 1001 is configured to execute the application program code stored in the memory 1003, to implement actions of the user equipment provided in any of the embodiments shown in FIG. 2 to FIG. 4.

An embodiment of this application further provides a computer storage medium, configured to store a computer software instruction used by the user equipment, and the computer software instruction includes a program designed for the user equipment to perform the foregoing aspects.

Figure 7:
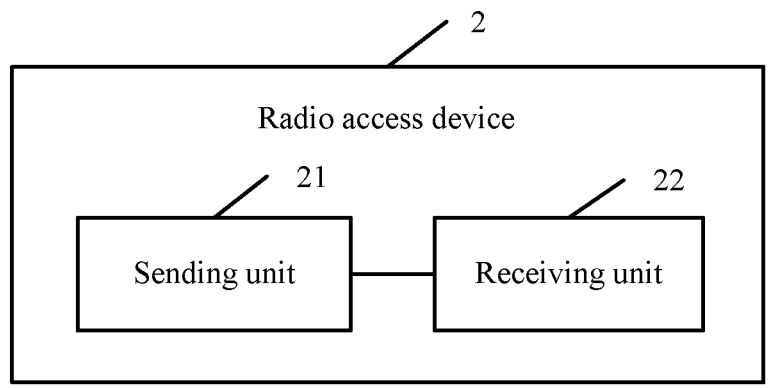
FIG. 7 is a schematic modular diagram of a radio access device according to an embodiment of this application.

FIG. 7 is a schematic modular diagram of a radio access device according to an embodiment of this application. The radio access device in this embodiment of this application may be the radio access device described in any of the method embodiments shown in FIG. 2 and FIG. 3. Therefore, repeated content in any of the method embodiments shown in FIG. 2 and FIG. 3 may not be described again in this embodiment.

As shown in FIG. 7, a radio access device 2 in this embodiment of this application may include a sending unit 21 and a receiving unit 22.

The sending unit 21 is configured to send first information to user equipment. The first information indicates different transmission classes corresponding to a plurality of logical channels.

The first information is used by the user equipment to determine a transmission format of uplink data on at least one logical channel corresponding to at least one transmission class in the different transmission classes, and determine transmission resources in the transmission format.

Optionally, the radio access device 2 further includes:
a receiving unit 22, configured to: after the sending unit 21 sends the first information, receive second information sent by the user equipment, where the second information indicates an amount of the to-be-sent uplink data on the at least one logical channel corresponding to the at least one transmission class in the different transmission classes.

Optionally, the sending unit 21 is further configured to send third information to the user equipment, where the third information indicates the transmission format used for the uplink data on the at least one logical channel corresponding to the at least one transmission class in the different transmission classes, and indicates the transmission resources in the transmission format.

Optionally, the sending unit 21 is further configured to send fourth information to the user equipment. The fourth information indicates a first location index of each transmission class in the at least one transmission class, and the first location index is used to identify a location, in the second information, of an amount of to-be-sent uplink data of each transmission class in the at least one transmission class.

Figure 8:
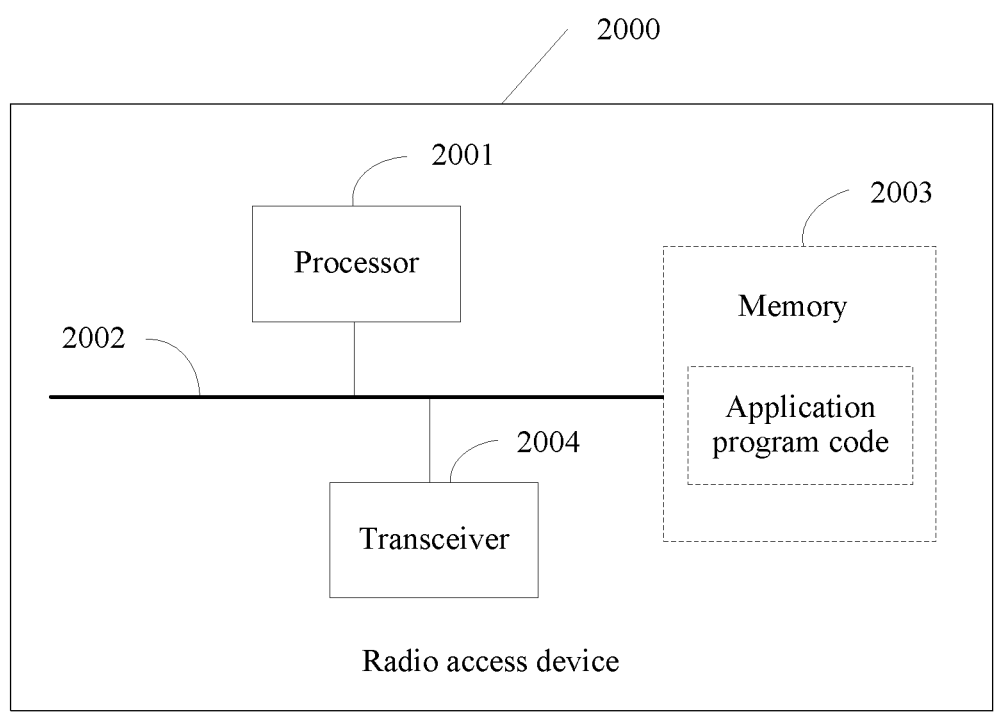
FIG. 8 is a schematic structural diagram of a radio access device according to an embodiment of this application.

The radio access device in the embodiment shown in FIG. 7 may be implemented by using a radio access device shown in FIG. 8. FIG. 8 is a schematic structural diagram of a radio access device according to an embodiment of this application. A radio access device 2000 shown in FIG. 8 includes a processor 2001 and a transceiver 2004.

The processor 2001 and the transceiver 2004 are connected, for example, connected by using a bus 2002. Optionally, the radio access device 2000 may further include a memory 2003.

It should be noted that there is at least one transceiver 2004 in actual application, and a structure of the radio access device 2000 constitutes no limitation on this embodiment of this application.

The transceiver 2004 includes a receiver and a transmitter. The transceiver 2004 is applied to this embodiment of this application, and is configured to implement functions of the sending unit 21 and the receiving unit 22 shown in FIG. 7.

The processor 2001 may be a CPU, a general purpose processor, a DSP, an ASIC, an FPGA or another programmable logic device, a transistor logic device, a hardware component, or any combination thereof. The processor 2001 may implement or execute various example logical blocks, modules, and circuits described with reference to content disclosed in this application. Alternatively, the processor 2001 may be a combination of processors implementing a computing function, for example, a combination of one or more microprocessors, or a combination of a DSP and a microprocessor, and the like.

The bus 2002 may include a channel, used to transmit information between the foregoing components. The bus 2002 may be a PCI bus, an EISA bus, or the like. The bus 2002 may be classified into an address bus, a data bus, a control bus, and the like. For ease of representation, only one thick line is used to represent the bus in FIG. 8, but this does not mean that there is only one bus or only one type of bus.

The memory 2003 may be a ROM or another type of static storage device that can store static information and instructions, or a RAM or another type of dynamic storage device that can store information and instructions; or may be an EEPROM, a CD-ROM or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto.

Optionally, the memory 2003 is configured to store application program code for executing the solutions of this application, and the processor 2001 controls execution of the solutions of this application. The processor 2001 is configured to execute the application program code stored in the memory 2003, to implement actions of the radio access device provided in any of the embodiments shown in FIG. 2 to FIG. 4.

An embodiment of this application further provides a computer storage medium, configured to store a computer software instruction used by the radio access device, and the computer software instruction includes a program designed for the radio access device to perform the foregoing aspects.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of "a plurality of". A single processor or another unit may implement several functions enumerated in the claims. Some measures are recorded in dependent claims that are different from each other, but this does not mean that these measures cannot be combined to produce a better effect.

To make a person skilled in the art understand the technical solutions in this application better, the following describes the technical solutions in the embodiments of this application with reference to the accompanying drawings in the embodiments of this application. In the specification, claims, and accompanying drawings of this application, the terms "first", "second", "third", "fourth" and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

A person skilled in the art should understand that the embodiments of this application may be provided as a method, an apparatus (device), or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with other hardware, or may use another allocation form, such as by using the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, apparently, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Apparently, a person skilled in the art can make various modifications and variations to this application without departing from the spirit and scope of this application. This application is intended to cover these modifica-

What is claimed is:

1. A data transmission method comprising:
receiving, by user equipment, first and third information from a radio access device,
wherein the first information indicates different transmission classes associated with a plurality of logical channels and each transmission class depends on a reliability requirement and latency requirement of a service,
wherein the third information indicates a transmission format for uplink data on at least one of the plurality of logical channels and a transmission resource in the transmission format, and
wherein the at least one logic channel is associated with at least one transmission class in the different transmission classes;
determining, by the user equipment and based on the first and third information, the transmission format of the uplink data on the at least one logical channel associated with the at least one transmission class in the different transmission classes, and the transmission resource in the transmission format,
wherein the transmission format of the uplink data is a subcarrier spacing for orthogonal frequency division multiplexing at a physical layer; and
sending, by the user equipment, the uplink data by using the transmission format and the transmission resource in the transmission format.

2. The method according to claim 1, further comprising:
sending, by the user equipment, second information to the radio access device, wherein the second information indicates an amount of the uplink data that is to be sent on the at least one logical channel associated with the at least one transmission class in the different transmission classes.

3. The method according to claim 2, further comprising:
receiving, by the user equipment, fourth information sent by the radio access device, wherein the fourth information indicates a first location index of each transmission class in the at least one transmission class, and the first location index is used to identify a location in the second information, wherein the location is of an amount of to-be-sent uplink data of each transmission class in the at least one transmission class.

4. The method according to claim 1, wherein uplink data on each logical channel in the at least one logical channel is a plurality of uplink data packets, and the method further comprises:
in a process in which the user equipment sends the plurality of uplink data packets, allocating, by the user equipment, more transmission resources to an uplink data packet with a high priority in the plurality of uplink data packets.

5. The method according to claim 1, further comprising:
in a process in which the user equipment sends uplink data on a target logical channel, wherein the target logical channel is a logical channel in the at least one logical channel,
at a packet data convergence protocol (PDCP) layer and upon expiration of a timer of a target data packet in the uplink data, discarding, by the user equipment, the target data packet at the PDCP layer; and notifying, by using a radio link control (RLC) layer, an RLC layer of the radio access device of an identifier of the target data packet.

6. The method according to claim 1, further comprising:
in a process in which the user equipment sends uplink data on a target logical channel, wherein the target logical channel is a logical channel in the at least one logical channel,
at a radio link control (RLC) layer and upon expiration of a timer of a target data packet in the uplink data, discarding, by the user equipment, the target data packet at the RLC layer; and notifying, by using the RLC layer, an RLC layer of the radio access device of an identifier of the target data packet.

7. The method according to claim 1, further comprising:
in a process in which the user equipment sends uplink data on a target logical channel, wherein the target logical channel is a logical channel in the at least one logical channel,
at a media access control (MAC) layer and upon expiration of a timer of a target data packet in the uplink data, discarding, by the user equipment, the target data packet at the MAC layer; and notifying, by using a radio link control (RLC) layer, an RLC layer of the radio access device of an identifier of the target data packet.

8. User equipment comprising:
a receiver configured to cooperate with a processor to receive first and third information sent by a radio access device,
wherein the first information indicates different transmission classes associated with a plurality of logical channels and each transmission class depends on a reliability requirement and latency requirement of a service,
wherein the third information indicates a transmission format for uplink data on at least one of the plurality of logical channels and a transmission resource in the transmission format, and
wherein the at least one logic channel is associated with at least one transmission class in the different transmission classes;
the processor configured to, based on the first and third information, determine a transmission format of the uplink data on the at least one logical channel associated with the at least one transmission class in the different transmission classes, and a transmission resource in the transmission format,
wherein the transmission format of the uplink data is subcarrier spacing for orthogonal frequency division multiplexing at a physical layer; and
a transmitter configured to cooperate with the processor to send the uplink data by using the transmission format and the transmission resource in the transmission format.

9. The user equipment according to claim 8, wherein the transmitter is further configured to send second information to the radio access network device, wherein the second information indicates an amount of the uplink data that is to be sent on the at least one logical channel associated with the at least one transmission class in the different transmission classes.

10. The user equipment according to claim 9, wherein the receiver is further configured to receive fourth information sent by the radio access device, wherein the fourth information indicates a first location index of each transmission class in the at least one transmission class, and the first location index is used to identify a location in the second information, wherein the location is of an amount of to-be-sent uplink data of each transmission class in the at least one transmission class.

11. The user equipment according to claim 8, wherein uplink data on each logical channel in the at least one logical channel is a plurality of uplink data packets, and the processor is further configured to: in a process of sending the plurality of uplink data packets, allocate more transmission resource to an uplink data packet with a high priority in the plurality of uplink data packets.

12. The user equipment according to claim 8, wherein in a process of sending uplink data on a target logical channel, wherein the target logical channel is a logical channel in the at least one logical channel,
the transmitter is further configured to: at a packet data convergence protocol (PDCP) layer and upon expiration of a timer of a target data packet in the uplink data, discard the target data packet at the PDCP layer; and notify, by using a radio link control (RLC) layer, an RLC layer of the radio access device of an identifier of the target data packet.

13. The user equipment according to claim 8, wherein in a process of sending uplink data on a target logical channel, wherein the target logical channel is a logical channel in the at least one logical channel,
the transmitter is further configured to: at a radio link control (RLC) layer and upon expiration of a timer of a target data packet in the uplink data, discard the target data packet at the RLC layer; and notify, by using the RLC layer, an RLC layer of the radio access device of an identifier of the target data packet.

14. The user equipment according to claim 8, wherein in a process of sending uplink data on a target logical channel, wherein the target logical channel is a logical channel in the at least one logical channel,
the transmitter is further configured to: at a media access control (MAC) layer and upon expiration of a timer of a target data packet in the uplink data, discard the target data packet at the MAC layer; and notify, by using a radio link control (RLC) layer, an RLC layer of the radio access device of an identifier of the target data packet.

15. A radio access device comprising:
a processor configured to determine first and third information;
a transmitter configured to cooperate with the processor to send the first and third information to user equipment,
wherein the first information indicates different transmission classes associated with a plurality of logical channels and each transmission class depends on a reliability requirement and latency requirement of a service,
wherein the third information indicates a transmission format for uplink data on at least one of the plurality of logical channels and a transmission resource in the transmission format,
wherein the at least one logic channel is associated with at least one transmission class in the different transmission classes,
wherein the transmission format of the uplink data is subcarrier spacing for orthogonal frequency division multiplexing at a physical layer; and
a receiver configured to cooperate with the processor to receive the uplink data using the transmission format in the transmission resource.

16. The radio access device according to claim 15, wherein the receiver is further configured to cooperate with the processor to receive second information sent by the user equipment,
wherein the second information indicates an amount of the uplink data that is to be sent on the at least one logical channel associated with the at least one transmission class in the different transmission classes.

17. The radio access device according to claim 16, wherein the transmitter is further configured to send fourth information to the user equipment, wherein the fourth information indicates a first location index of each transmission class in the at least one transmission class, and the first location index is used to identify a location in the second information, wherein the location is of an amount of to-be-sent uplink data of each transmission class in the at least one transmission class.

* * * * *